(12) United States Patent
Nishimura

(10) Patent No.: US 7,670,225 B2
(45) Date of Patent: Mar. 2, 2010

(54) MULTI-USER METHOD AND APPARATUS FOR PLACING GAME ELEMENTS ON A MAP BASED ON DEGREE OF DIFFICULTY

(75) Inventor: Katsuhito Nishimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1343 days.

(21) Appl. No.: 10/838,315

(22) Filed: May 5, 2004

(65) Prior Publication Data

US 2004/0229689 A1 Nov. 18, 2004

(30) Foreign Application Priority Data

May 12, 2003 (JP) ............................... 2003-133669

(51) Int. Cl.
*A63F 13/10* (2006.01)
(52) U.S. Cl. ................................. 463/30; 463/1; 463/33
(58) Field of Classification Search ..................... 463/1, 463/30–34
See application file for complete search history.

(56) References Cited

U.S. PATENT DOCUMENTS

| | | | |
|---|---|---|---|
| 5,616,079 A | 4/1997 | Iwase et al. | |
| 5,774,125 A | 6/1998 | Suzuoki et al. | |
| 6,123,619 A | 9/2000 | Tokita et al. | |
| 6,133,923 A | 10/2000 | Ozawa | |
| 6,213,878 B1 * | 4/2001 | Setsumasa et al. | 463/31 |
| 6,371,856 B1 | 4/2002 | Niwa | |
| 6,699,194 B1 | 3/2004 | Diab et al. | |
| 2003/0058238 A1 | 3/2003 | Doak et al. | |

FOREIGN PATENT DOCUMENTS

| | | |
|---|---|---|
| JP | 11-144087 | 5/1999 |
| JP | 2000-107441 | 4/2000 |
| JP | 2001-096067 | 4/2001 |

OTHER PUBLICATIONS

Zelda II—Adventure of Link—Instruction Booklet.*
Office Action dated Oct. 20, 2006 issued in the corresponding Japanese application.
"Dragon Quest Official Guide Book," ENIX Corporation, Oct. 1, 1988, first edition, pp. 49.
Ohta, "Rouge Clone 2, Japanese version", Aug. 27, 1989, URL, http://www.vector.co.jp/soft/dos/game/se000996.html, http://my.vector.co.jp/servlet/System.FileDownload/download/http/0/996/pack/dos/game/rpg/jrog13so.lzh.
Faria, "Jarulf's Guide to Diable and Hellfire" version 1.62 (2001).
"The Lurker Lounge," www.lurkerlounge.com.
"Diablo Video Game," http://en.wikipedia.org/wiki/Diablo_(computer_game).

* cited by examiner

*Primary Examiner*—Dmitry Suhol
*Assistant Examiner*—Damon J. Pierce
(74) *Attorney, Agent, or Firm*—Nixon & Vanderhye P.C.

(57) ABSTRACT

By evaluating a distance starting from a start point to a unit on the map, the strength of an enemy character to be encountered, the degree of difficulty for an object to pass through a gate, etc., a unit score is calculated for each route. This unit score can be taken as an index of the degree of difficulty for the object to arrive at a unit from the start point. By using this unit score, the game elements can be appropriately disposed on the map in accordance with the degree of difficulty.

22 Claims, 27 Drawing Sheets

F I G. 2
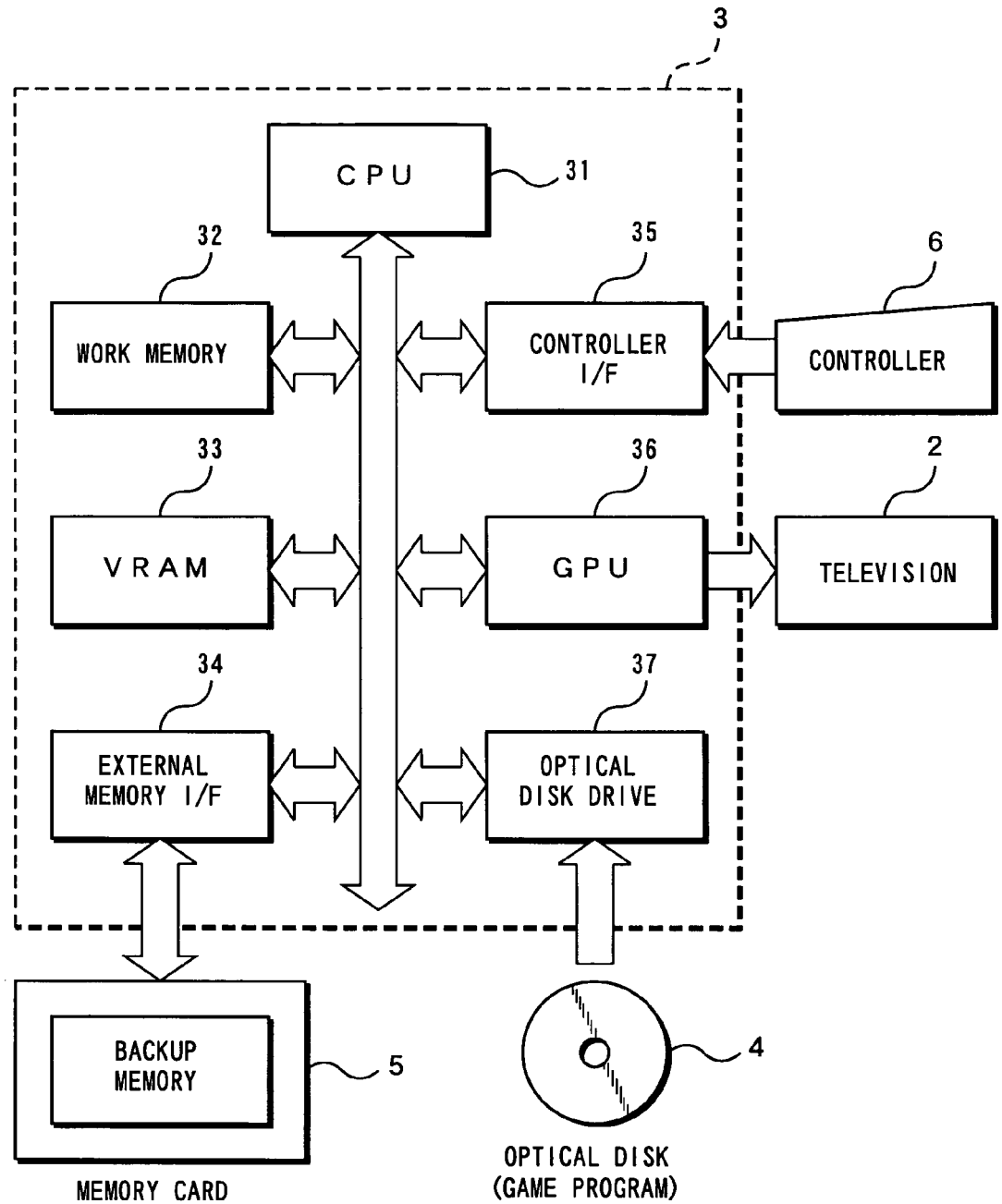

FIG. 5

ROOM UNIT TABLE

| ROOM UNIT | SIZE | DOOR | | | | | | SLOT | | | |
|---|---|---|---|---|---|---|---|---|---|---|---|
| | | DR1 | DR2 | DR3 | DR4 | DR5 | ... | Ss | Sg | Se | Si |
| RUa | 4×4 | a2 | b2 | c4 | d2 | — | — | 2 | 1 | 1 | 1 |
| RUb | 4×4 | a3 | b2 | c2 | c4 | d3 | — | 0 | 1 | 2 | 1 |
| RUc | 4×4 | a2 | c3 | — | — | — | — | 0 | 1 | 1 | 1 |
| RUd | 4×4 | c3 | — | — | — | — | — | 3 | 1 | 0 | 1 |
| ... | ... | ... | ... | ... | ... | ... | ... | ... | ... | ... | ... |

DOOR-TO-DOOR DISTANCE TABLE (RUa)

FIG. 6A

|  | DR2 | DR3 | DR4 |
|---|---|---|---|
| DR1 | 7 | 8 | 7 |
| DR2 | — | 11 | 8 |
| DR3 | — | — | 3 |

DOOR-TO-DOOR DISTANCE TABLE (RUb)

FIG. 6B

|  | DR2 | DR3 | DR4 | DR5 |
|---|---|---|---|---|
| DR1 | 5 | 8 | 10 | 7 |
| DR2 | — | 7 | 11 | 8 |
| DR3 | — | — | 4 | 9 |
| DR4 | — | — | — | 5 |

DOOR-TO-DOOR DISTANCE TABLE (RUc)

FIG. 6C

|  | DR2 |
|---|---|
| DR1 | 8 |

F I G. 7 A
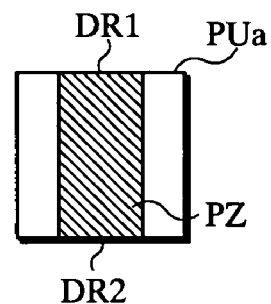
F I G. 7 B
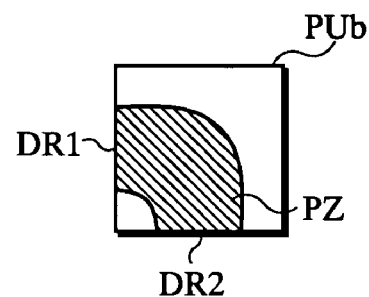
F I G. 7 C
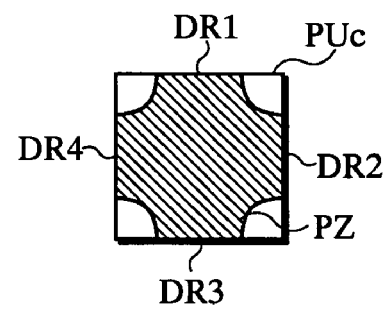
F I G. 7 D
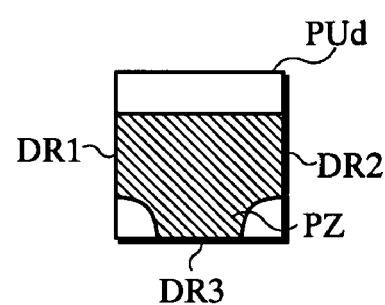
F I G. 7 E
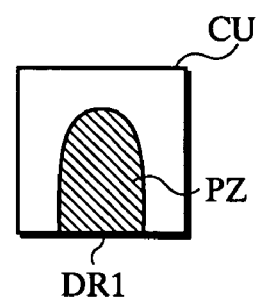

FIG. 8

PASSAGE UNIT TABLE

| PASSAGE UNIT | SIZE | DOOR | | | | |
|---|---|---|---|---|---|---|
| | | DR1 | DR2 | DR3 | DR4 | ... |
| PUa | 1×1 | a1 | c1 | — | — | — |
| PUb | 1×1 | d1 | c1 | — | — | — |
| PUc | 1×1 | a1 | b1 | c1 | d1 | — |
| PUd | 1×1 | d1 | b1 | c1 | — | — |
| ⋮ | ⋮ | ⋮ | ⋮ | ⋮ | ⋮ | ⋮ |

FIG. 9

CAP UNIT TABLE

| CAP UNIT | SIZE | DOOR | |
|---|---|---|---|
| | | DR1 | ... |
| CU | 1×1 | c1 | — |
| ⋮ | ⋮ | ⋮ | ⋮ |

FIG. 10A

DOOR-TO-DOOR DISTANCE TABLE (PUa)

|     | DR2 |
|-----|-----|
| DR1 | 2   |

FIG. 10B

DOOR-TO-DOOR DISTANCE TABLE (PUb)

|     | DR2 |
|-----|-----|
| DR1 | 1   |

FIG. 10C

DOOR-TO-DOOR DISTANCE TABLE (PUc)

|     | DR2 | DR3 | DR4 |
|-----|-----|-----|-----|
| DR1 | 1   | 2   | 1   |
| DR2 | —   | 1   | 2   |
| DR3 | —   | —   | 1   |

FIG. 10D

DOOR-TO-DOOR DISTANCE TABLE (PUd)

|     | DR2 | DR3 |
|-----|-----|-----|
| DR1 | 2   | 1   |
| DR2 | —   | 1   |

F I G. 18
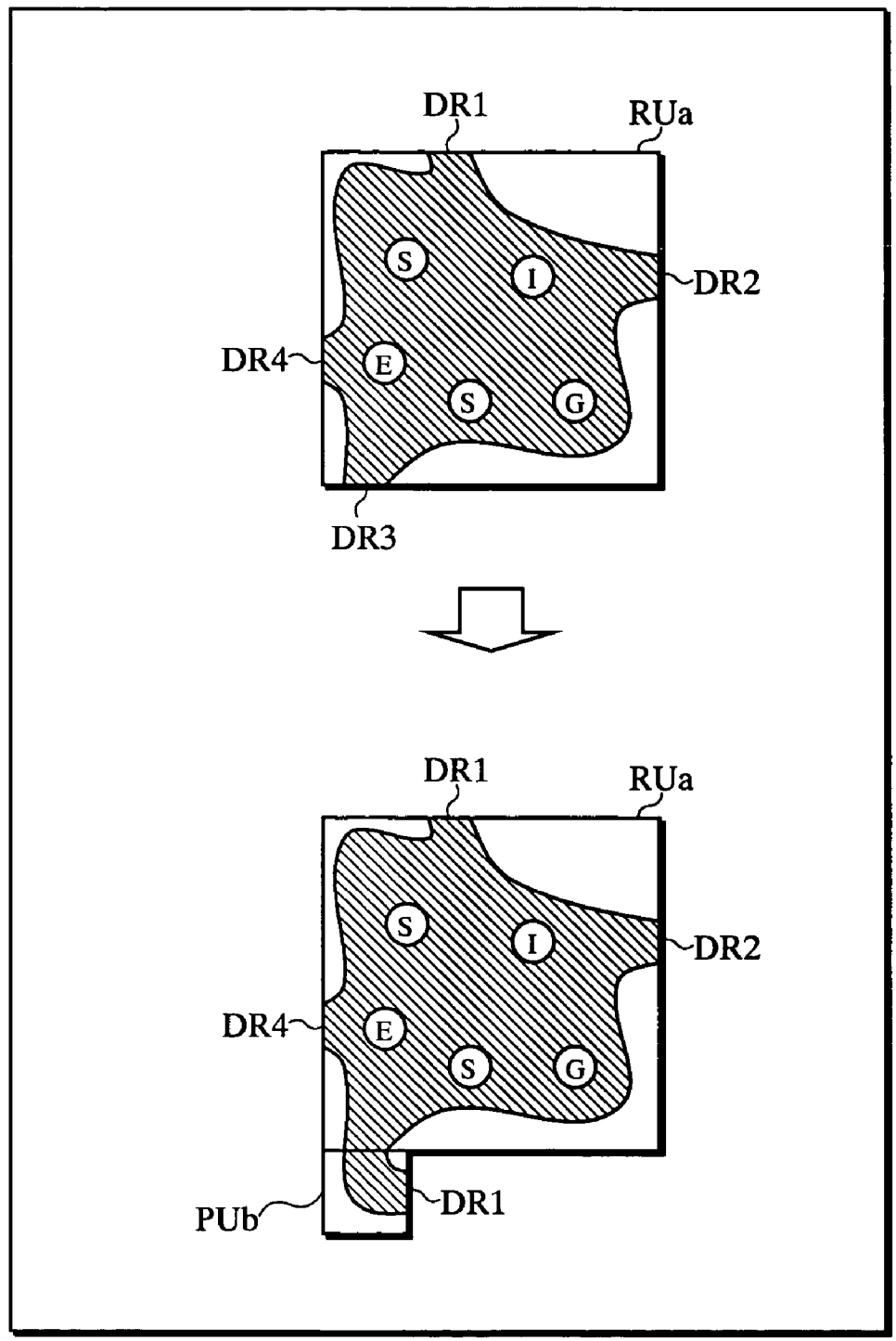

F I G. 23A
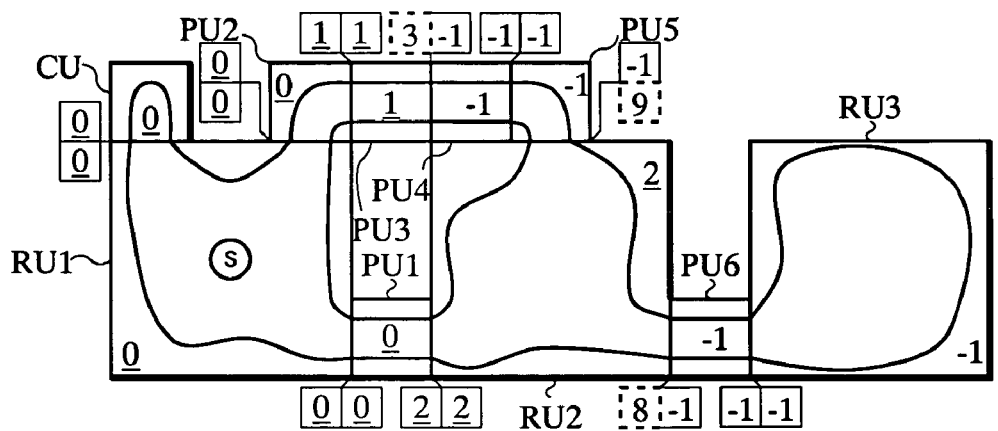
F I G. 23B
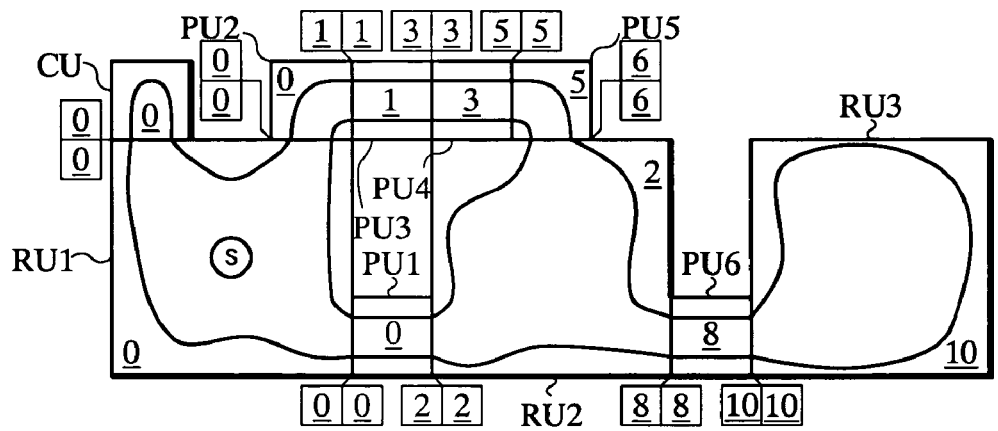

F I G. 27
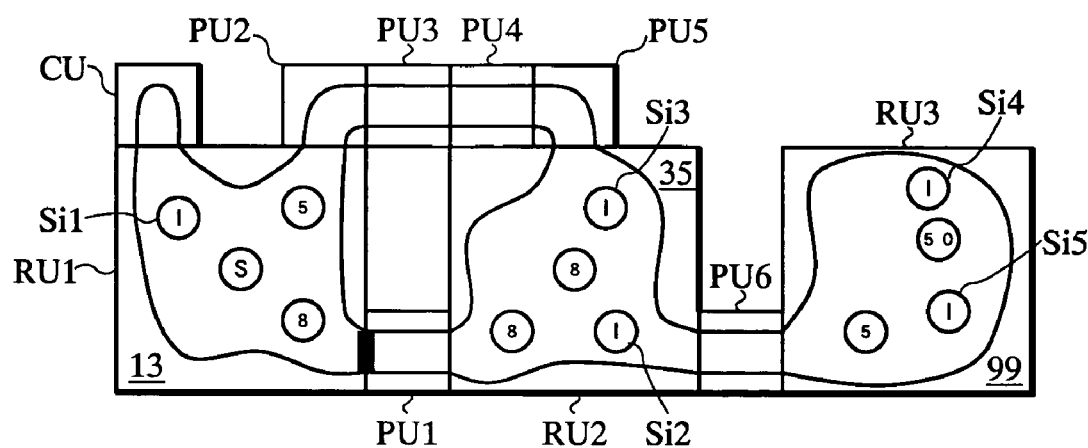

MULTI-USER METHOD AND APPARATUS FOR PLACING GAME ELEMENTS ON A MAP BASED ON DEGREE OF DIFFICULTY

STATEMENT REGARDING FEDERALLY SPONSORED RESEARCH OR DEVELOPMENT

Not applicable.

FIELD

The technology herein relates to game machines and data storage mediums having stored therein a game program and, more particularly, to a game machine and a data storage medium having stored therein a game program for automatically disposing additional game elements, such as items and enemy characters, on a game map.

BACKGROUND AND SUMMARY

Conventionally, various games have been developed in which a player object operated by a player is moved on a map. On the map, additional game elements (items, enemy characters, doors, a start point, a goal point, and the like) are disposed. With these game elements being not fixedly but changeably disposed, variety is added to the map, thereby allowing the game to proceed without making the user weary of the game. For example, in a conventional game machine as disclosed in Japanese Patent Laid-Open Publication No. 2000-107441, such game elements are randomly disposed on the map.

In the game machine disclosed in the in Japanese Patent Laid-Open Publication No. 2000-107441, the game elements, such as enemy elements and items, are randomly disposed on the map. Specifically, a memory of the game machine has stored, in its fixed area having a predetermined shape and size, a plurality of maps which form different patterns of terrains in the whole area. A game machine computer selects one map in accordance with the degree of difficulty of the game, and then randomly disposes the above game elements on the map. With this, it is possible to obtain a map having the game elements being differently disposed every time the game is played.

In the above-described conventional game machine, the game elements, such as the enemy characters and other items, are randomly disposed. Therefore, the game elements are not necessarily disposed at positions appropriate for the progress of the game. For example, when the random process disposes many items or an important enemy character at the start point on the generated map, the enjoyment of playing the game on the map is quickly satisfied in the vicinity of the start point, thereby making the game less entertaining. Moreover, when there are a plurality of routes to the destination on the map, the degrees of difficulty of these routes do not depend on how the game elements are disposed on each route, and therefore the player may easily arrive at the destination through the selected route.

Exemplary illustrative non-limiting implementations herein provide a game machine and a data storage medium having a game program stored therein allowing additional game elements to be not fixedly but changeably disposed at an appropriate position on a map.

The exemplary illustrative non-limiting implementation has the following features to attain the object mentioned above:

calculating a unit score for each of the units, the unit score being determined based on route information regarding a route starting from a start unit serving as a start point on the game map to each unit;

selecting, based on the unit score calculated in the unit score calculating step, a unit on which the game element is disposed; and disposing the game element on the unit selected in the disposition unit selecting step.

A first aspect of an exemplary illustrative non-limiting implementation is directed to a game machine for disposing an additional game element (an enemy character, a gate, an item, a goal point) on a game map formed by a plurality of units (which exemplarily corresponds to, in the preferred exemplary illustrative non-limiting arrangement, a room unit RU, a passage unit PU, a cap unit CU). The game machine includes: unit score calculating means (which exemplarily corresponds to, in the preferred exemplary illustrative non-limiting arrangement, a CPU 31 steps executing S82, S86, and S94; only step numbers are hereinafter shown), disposition unit selecting means (S84, S91, S99, S104), and game element disposition means (S84, S91, S99, S104). The unit score calculating means calculates a unit score for each of the units, the unit score being determined based on route information regarding a route (route distance, the number and type of an enemy character located on the route, the number and type of a gate located on the route) starting from a start unit serving as a start point on the game map to each unit. The disposition unit selecting means selects a unit on which the game element is disposed, based on the unit score calculated by the unit score calculating mean. The game element disposing means disposes the game element on the unit selected by the disposition unit selecting means. Note that the game machine may further include start unit determining means which determines the start unit including the start point on this map. Also, in the game machine, the unit score may be determined in consideration of, in addition to the information regarding the route to the relevant unit, information regarding the inside of the unit (the number and type of enemy characters, for example). Furthermore, if the unit score of the start unit is calculated, although not necessarily required, one exemplary scheme used for calculation is based on the game elements located in the start unit. In this case, the unit score may be set higher as the number of enemy characters is larger. Alternatively, the unit score may be set higher as the strength of the enemy character is higher. In another calculation scheme, the unit score of the start unit may be set to a predetermined value (0, for example).

According to the above configuration of the exemplary illustrative non-limiting implementation, the unit score is calculated based on the information regarding the route from the start point on the game map to each unit. By using the route distance, the number and type of the enemy characters located on the route, the number and type of the gates located on the route, etc., as the route information, it is possible to cause the unit score to indicate the degree of difficulty for the player character or the like to arrive at the unit. Also, by using the number and type of the items located on the route, etc., as the route information, it is possible to cause the unit score to indicate the merit obtained until the player character or the like arrives at the unit. Then, by using the unit score, a game element is additionally disposed on the game map. Therefore, the game element can be appropriately disposed in accordance with the degree of difficulty or the merit. For example, when the unit score indicates the degree of difficulty, the following examples can be thought. That is, in order to set a precious item to be difficult for the player to obtain, the precious item may be disposed on a unit having a high unit score. Also, an item supporting the player may be disposed on a unit having a high unit score. Furthermore, a goal point may be set in a unit having the highest unit score. Still further, a weak enemy character may be disposed on a unit having a low unit score, while a strong enemy character may be disposed on a unit having a high unit score. Still further, when the unit score indicates the merit, a strong enemy character may be disposed on a unit having a high unit score, for example. These are merely examples, and the unit score may be used in various manners depending on the contents of the game and the intention of the game designer. By contrast to the above examples, depending on the contents of the game, a precious item may be disposed on a unit having a lower unit score, or a game element may be disposed on a unit having an intermediate unit score. As described above, although the unit score indicates the degree of difficulty or the merit, description is hereinafter made mainly to a case where the unit score indicates the degree of difficulty. The same description goes for the case where the unit score indicates the merit.

By way of example only, the unit score calculating means calculates a distance parameter for each of the units as the unit score, the distance parameter being indicative of a distance of the route starting from the start unit to each unit. With this, as the distance from the start point to a unit is longer, it is more difficult for the object to arrive at that unit. Therefore, by calculating a distance parameter indicative of the distance, the unit score representing the degree of difficulty by the distance can be obtained. Then, based on the distance parameter, a game element is disposed. Therefore, the game element can be appropriately disposed in consideration of the entertainment aspect of the game. For example, a game element, such as a goal point, the most important enemy character, an item, etc., which is preferably disposed on the unit farther away from the start point, can be appropriately disposed in accordance with the distance from the start point. For example, each of the units includes at least one connecting portion (door DR) for connection to another unit, and with the connecting portion being connected to another connecting portion of the other unit, the units are combined to form the game map. In this case, the game machine may further include connecting portion distance data defining means (a unit storage area 322 storing the door-to-door distance table). The connecting portion distance data defining means defines connecting portion distance data (door-to-door distance data) indicative of a distance between the connecting portions in a unit having a plurality of the connecting portions. The unit score calculating means calculates the distance parameter by totaling the connecting portion distance data for connecting portions to be passed through on the route starting from the start unit to each unit. With this, the distance parameter can be appropriately and easily calculated.

In another example, the unit score calculating means calculates the unit score based on game elements located in a unit to be passed through on the route starting from the start unit to each unit. With this, as the unit has more game elements serving as obstacles, such as enemy characters and doors, which the object, such as the player character, encounters on a route from the start point to one unit, it is more difficult to arrive at that unit. Therefore, the unit score representing the degree of difficulty by the obstacle can be obtained. Also, as the unit has more game elements, such as town people characters, which the object encounters on a route from the start point to one unit and which give the object an item or a hint, the merit of arriving at that unit is larger. Therefore, the unit score representing the merit can be obtained. Then, based on the unit score indicative of the degree of difficulty or the merit, the game element is disposed. Therefore, the game element can be appropriately disposed in consideration of the entertainment aspect of the game. For example, a game element, such as a goal point or the most important item, that is preferably disposed on the unit at which the object arrives from the start point after clearing many obstacles can be appropriately disposed based on the obstacles on the route from the start point. Also, the game machine may further include attribute value setting means. The attribute value setting means sets a unique attribute value (the strength of the enemy, the strength of the gate) based on a type of each of the game elements. The unit score calculating means calculates the unit score based on the attribute value set to each of the game elements located in the unit to be passed through. With this, when the object encounters the enemy character, which is a game element, while traveling from the start point, the strength of the enemy character, etc., will have an influence on the degree of difficulty in arriving at the unit. Since the unit score is set in consideration of the attribute value of the strength of the enemy character, the unit score more accurately indicative of the degree of difficulty can be set. Also, for example, if the unit score is set in consideration of the effectiveness of the item, the unit score accurately indicative of the merit can be set.

For example, each of the units includes at least one connecting portion for connection to another unit, and with the connecting portion being connected to another connecting portion of the other unit, the units are combined to form the game map. In this case, the game machine may further include connecting portion score calculating means (S825, S826, S830). The connecting portion score calculating means calculates, for each connecting portion, a connecting portion score (door score) determined based on route information regarding a route from the start unit to each connecting unit. The unit score calculating means calculates the unit score for each of the units based on the connecting portion score calculated for the connecting portion included in a relevant unit (S828). With this, in consideration of the connecting portion serving as an entrance or exit of each unit, the connecting portion score indicative of the degree of difficulty or the merit for the object to travel from the start point to that connecting portion can be calculated. Then, the unit score of the unit including the connecting unit is calculated with the connecting portion score. Therefore, each unit score can be appropriately and easily obtained. Furthermore, the unit score calculating means may calculate the unit score for a unit which includes a plurality of the connecting portions based on a minimum value of the connecting unit scores calculated for the connecting portions (S825 through S828). In this case, the unit score of the unit including the connecting portion is calculated with the minimum value of the connecting portion score. Therefore, the unit score obtained when the object travels from the start point to each unit with a lowest degree of difficulty and the easiest travel can be appropriately and easily obtained. Still further, start unit connecting portion score temporarily-setting means may be provided, which calculates the connecting portion score for each of the connecting portions included in the start unit through a predetermined calculation scheme and temporarily sets the calculated connecting portion score. Here, the predetermined calculation scheme is, for example, a scheme based on the game element located in the start unit. In this case, the connecting portion score is set higher as the number of enemy characters located in the start unit is larger (or as the strength of the enemy characters is larger) or when a gate is set in that connecting portion included in the start unit. In another exemplary calculation scheme, a predetermined value (0, for example) may be set to all connecting portions included in the start unit. Still further, the unit score calculating means may include: minimum connecting portion score determining means (S825), the coupled connecting portion score determining means (S826), and connecting portion score temporarily-setting means (S830). The minimum connecting portion score determining means determines a minimum value of the connecting portion scores temporarily set to the connecting portions as the connecting portion score of a connecting portion having the minimum value. The coupled connecting portion score determining means determines the minimum value as the connecting portion score of a connecting portion coupled to the connecting portion whose connecting portion score has been determined by the minimum connecting portion score determining means. The connecting portion score temporarily-setting means calculates a connecting portion score for a first connecting portion whose connecting portion score has not yet been determined and temporarily sets the calculated connecting portion score, the first connecting portion being included in a unit which also includes a second connecting portion whose connecting portion score has been determined by the minimum connecting portion score determining section or the coupled connecting portion score determining section, and the connecting portion score for the first connecting portion being calculated based on route information regarding a route from the second connecting portion to the first connecting portion included in the unit (S830). With a repeat of processes performed by the minimum score determining means, the coupled connecting portion score determining means, and the connecting portion score temporarily-setting means (a repeat of steps S825 through S830), the unit score calculating means sequentially determines connecting portion scores of the connecting portions on the game map, and calculates the unit score based on the determined connecting portion scores (S828). With this, the minimum connecting portion score is determined with priority by taking the connecting portion score of the start unit in which the start point is set as a starting point. Also, based on the determined connecting portion score, the unit score is also determined. Therefore, to all units and connecting portions formed on the game map, it is possible to reliably calculate their unit scores and connecting portion scores by using the lowest degree of difficulty for the object to arrive from the start unit.

The disposition unit selecting means may select the unit on which the game element is disposed so that a ratio of a unit score of one unit with respect to a total of the unit scores is equal to a probability of selecting the one unit (S96 through S99). With this, each degree of difficulty for the object to arrive at each unit from the starting point is evaluated with respect to the entire degree of difficulty, and based on the evaluation, the game element can be disposed. For example, a game element can be reliably disposed with priority on the unit having a relatively high or the highest degree of difficulty. With this, a game element, such as a goal point or the most important item, that is preferably disposed on the unit at which the object arrives with difficulty after traveling from the start point can be appropriately disposed. Also, if a unit is selected based on a ratio of the degree of difficulty with respect to the entire degree of difficulty, as the unit has a higher degree of difficulty, the ratio of disposing a game element on that unit can be higher.

The disposition unit selecting means may include transformed unit score calculating means (S88, S96, S101). The transformed unit score calculating means calculates a transformed unit score (Tx) by transforming the unit score calculated by the unit score calculating means through a predetermined function (Scmax+Scmin−Sc(Ux) or the positive square root of Sc(Ux)). The disposition unit selecting means selects the unit on which the game element is disposed so that a ratio of a unit score of one unit with respect to a total of the unit scores is equal to a probability of selecting the one unit (S88 through S91 or S101 through S104). Thus, the unit score is transformed by using the predetermined function, and then the transformed unit score is used. With the function being appropriately set, the game elements can be disposed in various manners. For example, the unit having a lower degree of difficulty is prioritized for disposition. Alternatively, the unit having a higher degree of difficulty is prioritized for disposition but its degree of priority is reduced or increased. For example, the function used by the transformed unit score calculating means is varied depending on a type of the game element to be disposed by the game element disposing means. With this, it is possible to control the disposition point of the game element by the function depending on the type of the game element. Here, various types of game elements can be thought. For example, a goal point may be of a type not necessarily required to be disposed on a unit having a high degree of difficulty, and an obstacle may be of a type desired to be disposed on a unit having a low degree of difficulty. By selecting the function in accordance with the type of the game element, it is possible to balance between randomness of disposition of the game elements and units to be disposed.

Also, the disposition unit selecting means may include: random number generating means (S90, S98, S103) and range assigning means (FIG. 25). The random number generating means generates a random number in a predetermined range. The range assigning means assigns a part of the predetermined range to each of the units based on a ratio of each unit score with respect to the total of the unit scores or a ratio of each unit score with respect to a total of the transformed unit scores. The disposition unit selecting means selects the unit on which the game element is disposed depending on whether the random number generated by the random number generating means is within the part of the range assigned to the unit by the range assigning means.

For example, the game map include at least a unit including a point (start slot Ss, goal slot Sg, enemy slot Se, item slot Si) at which the game element can be disposed. In this case, the disposition unit selecting means may include: random number generating means and range assigning means (FIG. 28). The random number generating means generates a random number within a predetermined range. The range assigning means sets the unit score of the unit including the point as a point score of the point, and assigns a part of the predetermined range to each of a plurality of the points based on a ratio of each point score with respect to a total of point scores or a ratio of each point score transformed through a predetermined function with respect to a total of the transformed point scores. The disposition unit selecting means selects a point where the game element is disposed depending on whether the random number generated by the random number generating means is within the part of the range assigned to the point by the range assigning means. With this, a game element can be appropriately disposed at a point in the unit.

The game machine may further includes unit storage means (unit storage area 322 for storing a unit image data group) and game map generating means (S1 through S7). The unit storage means stores in advance the plurality of the units. The game map generating means generates the game map by randomly combining the units stored in the unit storage means. With this, effects similar to those of the first aspect of the exemplary illustrative non-limiting implementation can be obtained also for the automatically-generated game map full of diversity. Also, by combining the diversity in disposition of the game element with the diversity of the game map itself, a game map full of variation can be generated.

A second aspect of the exemplary illustrative non-limiting implementation is directed to a game machine for disposing an additional game element on a game map which is formed by a plurality of units and defines an area in which an object can move in the course of a game. The game machine includes: unit score calculating means, disposition unit selecting means, and disposition unit selecting means. The unit score calculating means calculates a unit score for each of the units, the unit score being a parameter indicative of a degree of difficulty for the object to move from a start unit serving as a start point on the game map to each unit. The disposition unit selecting means selects, based on the unit score calculated by the unit score calculating means, a unit on which the game element is disposed. The game element disposing means disposes the game element on the unit selected by the disposition unit selecting means.

According to the above configuration of the exemplary illustrative non-limiting implementation, the unit score is calculated in accordance with the degree of difficulty for the object to move to each unit. By using this unit score, a game element is additionally disposed on the game map. Therefore, the game element can be appropriately disposed in accordance with the degree of difficulty.

A third aspect of the exemplary illustrative non-limiting implementation is directed to a data storage medium having stored therein a game program causing a computer to execute a process of disposing an additional game element on a game map formed by a plurality of units. The game program stored in the data storage medium includes the steps of: a unit score calculating step (S82, S86, S94), a disposition unit selecting step (S84, S91, S99, S104), and a game element disposing step (S84, S91, S99, S104). In the unit score calculating step, a unit score is calculated for each of the units, the unit score being determined based on route information regarding a route starting from a start unit serving as a start point on the game map to each unit. In the disposition unit selecting step, a unit on which the game element is disposed is selected based on the unit score calculated in the unit score calculating step. In the game element disposing step, the game element is disposed on the unit selected in the disposition unit selecting step. With this, effects similar to those obtained by the above game machine can be obtained also by the computer executing the game program recorded on the recording medium.

By way of example only, in the unit score calculating step, a distance parameter is calculated for each of the units as the unit score, the distance parameter being indicative of a distance of the route starting from the start unit to each unit. In another example, in the unit score calculating step, the unit score is calculated based on game elements located in the unit to be passed through on the route starting from the start unit to each unit. For example, each of the units includes at least one connecting portion for connection to another unit, and with the connecting portion being connected to another connecting portion of the other unit, the units are combined to form the game map. In this case, the game program stored in the data storage medium may further include a start unit connecting portion score temporarily-setting step (S824). In this step, a connecting portion score is calculated for each of connecting portions included in the start unit through a predetermined calculation scheme, and the calculated connecting portion score is temporarily set. Also, the unit score calculating step includes a minimum connecting portion score determining step (S825), a coupled connecting portion score determining step (S826), and a connecting portion score temporarily-setting step (S830). In the minimum connecting portion score determining step, a minimum value of the connecting portion scores temporarily set to the connecting portions is determined as the connecting portion score of a connecting portion having the minimum value. In the coupled connecting portion score determining step, the minimum value is determined as the connecting portion score of a connecting portion coupled to the connecting portion whose connecting portion score has been determined in the minimum connecting portion score determining step. In the connecting portion score temporarily-setting step, a connecting portion score is calculated for a first connecting portion whose connecting portion score has not yet been determined and is temporarily set. The first connecting portion is included in a unit which also includes a second connecting portion whose connecting portion score has been determined in the minimum connecting portion score determining step or in the coupled connecting portion score determining step, and the connecting portion score for the first connecting portion is calculated based on route information regarding a route from the second connecting portion to the first connecting portion included in the unit. In the unit score calculating step, with a repeat of the minimum score determining step, the coupled connecting portion score determining step, and the connecting portion score temporarily-setting step, connecting portion scores of the connecting portions on the game map are sequentially determined, and the unit score is calculated based on the determined connecting portion score.

By way of example only, in the disposition unit selecting step, the unit on which the game element may be disposed is selected so that a ratio of a unit score of one unit with respect to a total of the unit scores is equal to a probability of selecting the one unit.

In another example, the disposition unit selecting step includes the steps of: a random number generating step and a range assigning step. In the random number generating step, a random number is generated in a predetermined range. In the range assigning step, a part of the predetermined range is assigned to each of the units based on a ratio of each unit score with respect to a total of the unit scores or a ratio of each unit score calculated in the unit score calculating step and then transformed through a predetermined function with respect to a total of the transformed unit scores. In the disposition unit selecting step, the unit on which the game element is disposed is selected depending on whether the random number generated in the random number generating step is within the part of the range assigned to the unit in the range assigning step.

BRIEF DESCRIPTION OF THE DRAWINGS

These and other objects, features, aspects and advantages of the present invention will become more apparent from the following detailed description of the present invention when taken in conjunction with the accompanying drawings.

FIG. 2 is a functional block diagram of a game machine 3 of FIG. 1;

FIG. 5 is an illustration showing one example of a room unit table stored in the unit storage area 322 of FIG. 3;

FIG. 6A is an illustration showing one example of a door-to-door distance table for the room unit RUa stored in the unit storage area 322 of FIG. 3;

FIG. 6B is an illustration showing one example of a door-to-door distance table for the room unit RUb stored in the unit storage area 322 of FIG. 3;

FIG. 6C is an illustration showing one example of a door-to-door distance table for the room unit RUc stored in the unit storage area 322 of FIG. 3;

FIG. 7A is an illustration showing one example of a passage unit PUa included in a passage unit image group stored in the unit storage area 322 of FIG. 3;

FIG. 7B is an illustration showing one example of a passage unit PUb included in the passage unit image group stored in the unit storage area 322 of FIG. 3;

FIG. 7C is an illustration showing one example of a passage unit PUc included in the passage unit image group stored in the unit storage area 322 of FIG. 3;

FIG. 7D is an illustration showing one example of a passage unit PUd included in the passage unit image group stored in the unit storage area 322 of FIG. 3;

FIG. 7E is an illustration showing one example of a cap unit CU stored in the unit storage area 322 of FIG. 3;

FIG. 8 is an illustration showing one example of a passage unit table stored in the unit storage area 322 of FIG. 3;

FIG. 9 is an illustration showing one example of a cap unit table stored in the unit storage area 322 of FIG. 3;

FIG. 10A is an illustration showing one example of a between door distance table for the passage unit PUa stored in the unit storage area 322 of FIG. 3;

FIG. 10B is an illustration showing one example of a door-to-door distance table for the passage unit PUb stored in the unit storage area 322 of FIG. 3;

FIG. 10C is an illustration showing one example of a door-to-door distance table for the passage unit PUc stored in the unit storage area 322 of FIG. 3;

FIG. 10D is an illustration showing one example of a door-to-door distance table for the passage unit PUd stored in the unit storage area 322 of FIG. 3;

FIG. 18 is an illustration showing one example in which a door DR3 of the passage unit PUa disposed on the map area is set as a selected door, and the selected door is connected to a door DR2 of the passage unit PUb for disposition;

FIG. 23A is an illustration for describing a first stage of the latter half of the score calculation process in step S82 of FIG. 14;

FIG. 23B is an illustration for describing a second stage of the latter half of the score calculation process in step S82 of FIG. 14;

FIG. 27 is an illustration showing an example of item slots Si1 through Si5 included in units disposed on a map shown in FIG. 26C.

DETAILED DESCRIPTION

Figure 1:
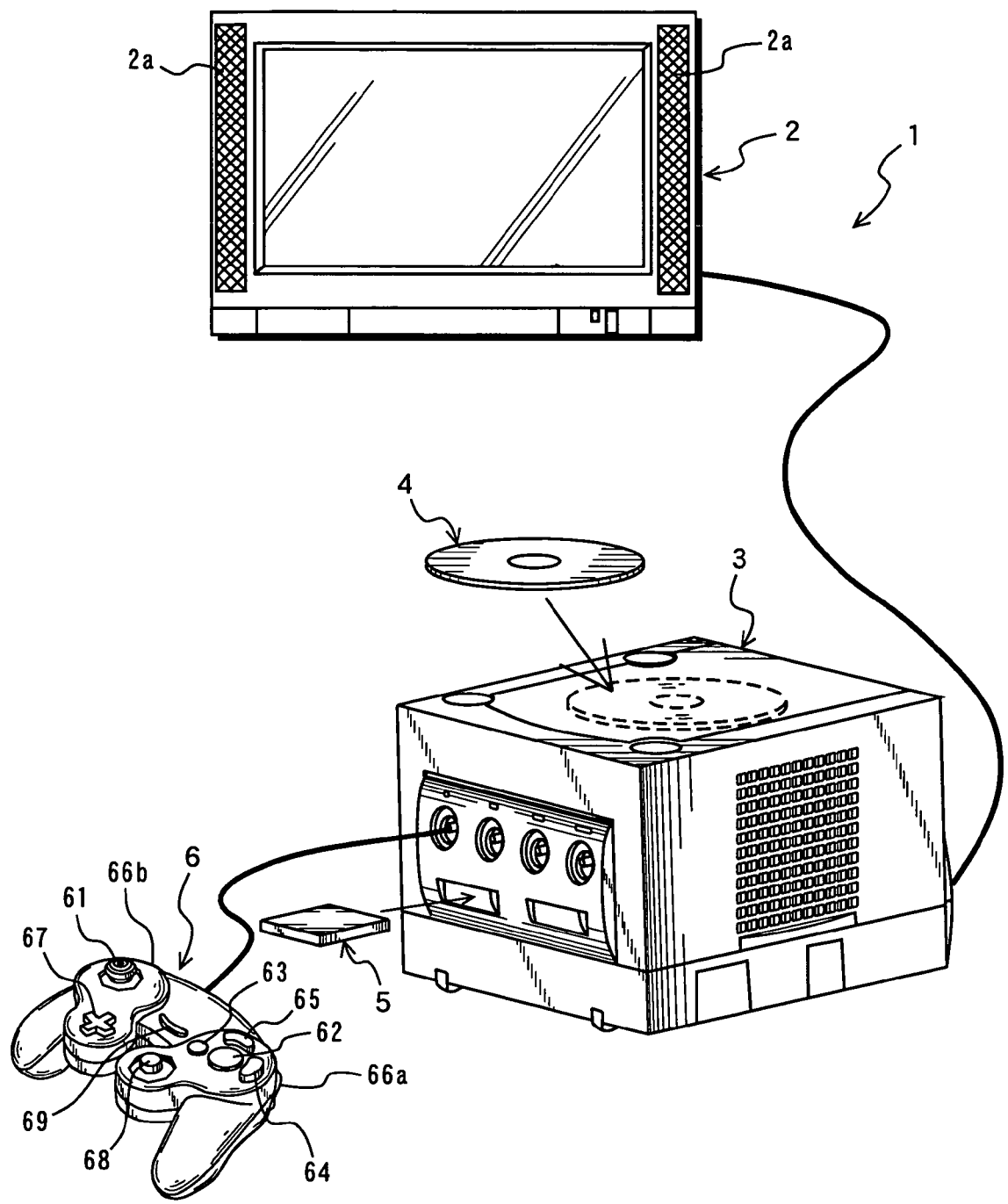
FIG. 1 is an external view for describing a game system 1 according to one exemplary non-limiting implementation.

With reference to FIG. 1, a game system 1 according to one exemplary illustrative non-limiting arrangement is described below. FIG. 1 is an external view of the game system 1. Hereinafter, the exemplary non-limiting arrangement is described by taking a non-portable game machine as an example.

In FIG. 1, the game system 1 is configured such that a non-portable game machine 3 is connected via a connection code 2a to a Cathode Ray Tube (CRT) display (hereinafter referred to as a television) 2, such as a home television receiver, having incorporated therein a loudspeaker. The game machine 3 includes a controller 6 connected to the game machine 3 via a connection code and an optical disc 4, which is one example of a selectively-used storage medium which can be exchangeably removed from the game machine 3. Also, as required, the game machine 3 has removably inserted therein a memory card 5 including, for example, a backup memory for fixedly storing save data, etc. The game machine 3 executes a game program stored in the optical disc 4 to cause the execution results to be displayed on the television 2 as a game image. Furthermore, the game machine 3 can use save data stored in the memory card 5 to reproduce a previous game state to cause a game image in that state to be displayed on the television 2. The player of the game machine 3 operates the controller 6 while viewing the game image displayed on the television 2, thereby enjoying the progress of the game. In the present exemplary illustrative non-limiting arrangement, the game program and other data are stored in the optical disc 4. Alternatively, the game program and other data can be supplied through another medium or a communication line.

As described above, the controller 6 is connected to the game machine 3 via the connection code, which is removable from the game machine 3. The controller 6 is an operation means for mainly operating a player object (typically, a game main character to be controlled by the player) appearing in a game space displayed on the television 2, and includes input units, such as a plurality of operation buttons, keys, a stick, etc. Specifically, the controller 6 has formed thereon grip portions held by the player. Furthermore, the controller 6 includes a main stick 61 and a cross key 67, which are operable typically by the left thumb of the player, and a C stick 68, an A button 62, a B button 63, an X button 64, a Y button 65, and a start-pause button 69, which are operable typically by the right thumb of the player. The controller 6 further includes an R button 66a and an L button 66b, which are operable typically by the left or right forefinger of the player. An operation using these input units of the controller 6 is performed in the course of the game. However, such an operation is not directly related to the exemplary illustrative non-limiting implementation and therefore is not described herein.

With reference to FIG. 2, the structure of the game machine 3 is described below. FIG. 2 is a functional block diagram of the game machine 3.

In FIG. 2, the game machine 3 includes a Central Processing Unit (CPU) 31 of, for example, 128 bits, for executing various programs. The CPU 31 executes a boot program stored in a boot ROM not shown to boot a memory, such as a work memory 32, and then executes the game program stored in the optical disc 4 for performing game processing in accordance with that game program. The CPU 31 has connected via a predetermined bus thereto the work memory 32, a video RAM (VRAM) 33, an external memory interface (I/F) 34, a controller (I/F) 35, a Graphics Processing Unit (GPU) 36, and an optical disc drive 37.

The work memory 32 is a storage area used by the CPU 31 and stores, as appropriate, a game program required for processes performed by the CPU 31. For example, the work memory 32 stores the game program and various data read from the optical disc 4. Also, the work memory 32 stores temporary data generated by the CPU 31 while executing the game program. By using the game program and various data stored in the work memory 32, the CPU 31 causes the game to proceed. The VRAM 33 stores game image data to be displayed on the television 2. The external memory I/F 34 communicably connects the game machine 3 and the memory card 5 by fitting the memory card 5 in a connector not shown. The CPU 31 accesses the backup memory provided in the memory card 5 via the external memory I/F 34. The controller I/F 35 communicably connects an external device fitted in a plurality of connectors not shown and the game machine 3 together. For example, the controller 6 is fitted in the above connectors via connection codes and is connected to the game machine via the controller I/F 35. The GPU 36 is structured, for example, by a semiconductor chip for performing a calculation process required for displaying 3D graphics, and processes game image data processed by the CPU 31 and game image data stored in the VRAM 33 for game image display on the television 2. The optical disc drive 37 reads the data stored in the optical disc 4 placed at a predetermined reading position for output to the bus of the game machine 3.

Figure 3:
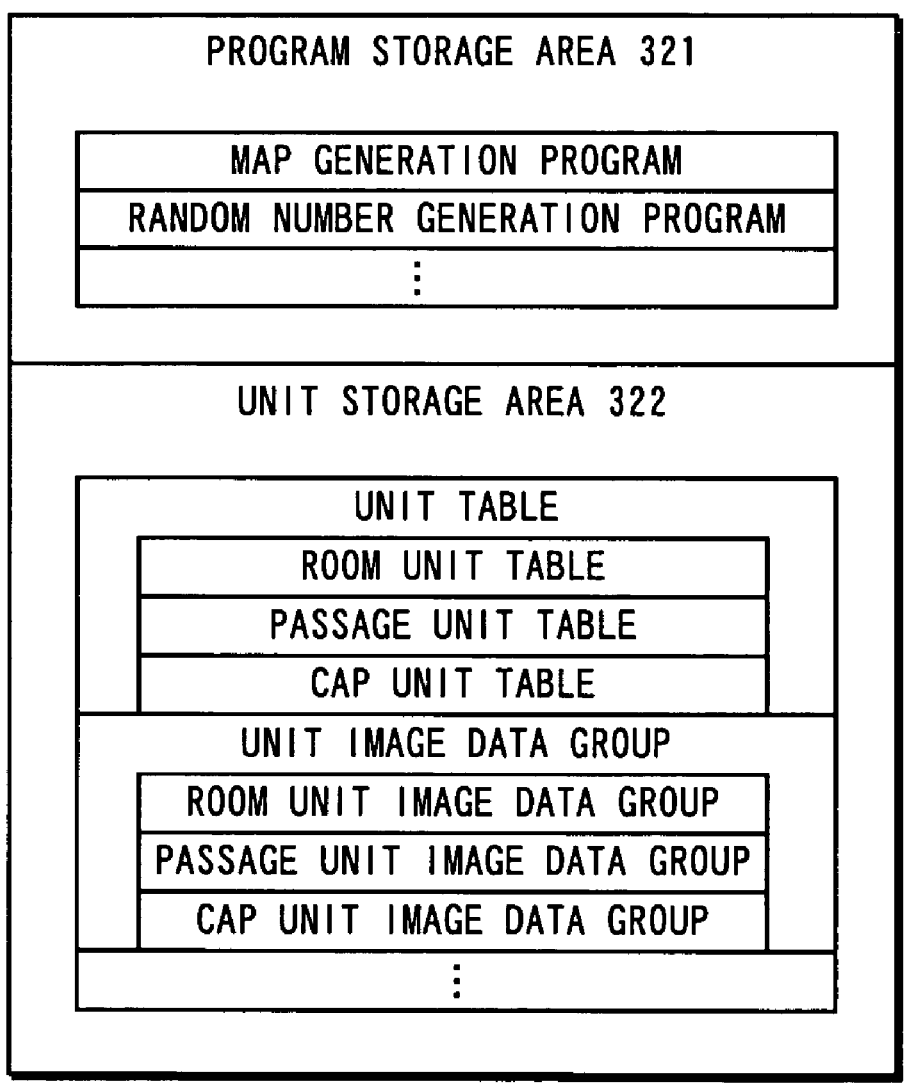
FIG. 3 is a schematic illustration of a memory map for describing one example of programs and data stored in a work memory 32 of FIG. 2.

As described above, the work memory 32 stores, as appropriate, the game program required for the processes performed by the CPU 31, such as the game program and other various data read by the CPU 31 from the optical disc 4. With reference to FIG. 3, examples of programs and data stored in the work memory 32 when the game program of the exemplary illustrative non-limiting implementation is executed. FIG. 3 is a schematic illustration of a memory map for describing one example of the programs and data stored in the work memory 32.

In FIG. 3, the work memory 32 has a program storage area 321 and a unit storage area 322. Specifically, the program storage area 321 has stored therein a map generation program to be executed by the CPU 31, a random number generation program used by the map generation program, a game element disposition program, etc. The unit storage area 322 has stored therein a unit table, a door-to-door distance table, and a unit image data group to be used by the map generation program, etc. The unit table includes a room unit table, a passage unit table, and a cap unit table. The unit image data group includes a room unit image group, a passage unit image group, and a cap unit image.

The map generation program has defined therein a process of generating a map to be used by the game and to be generated according to a flowchart which will be described further below. In this process, a random number is used for selecting a unit or a game element disposition place, which will be also described further below. The random number is generated by the random number generation program.

With reference to FIGS. 4A-4D, 5, and 6A-6C, the room unit image group, the room unit table, and the door-to-door distance table are described below. FIGS. 4A-4D are examples of a room unit included in the room unit image group stored in the unit storage area 322. FIG. 5 is an illustration showing one example of the room unit table. FIGS. 6A-6C are illustrations showing examples of the door-to-door distance table for each room unit.

Figure 4A:
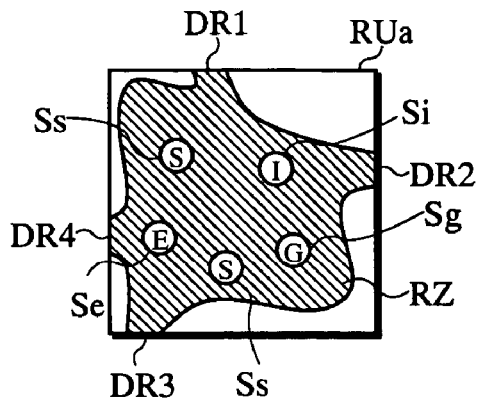
FIG. 4A is an illustration showing one example of a room unit RUa included in a room unit image group stored in a unit storage area 322 of FIG. 3.
Figure 4B:
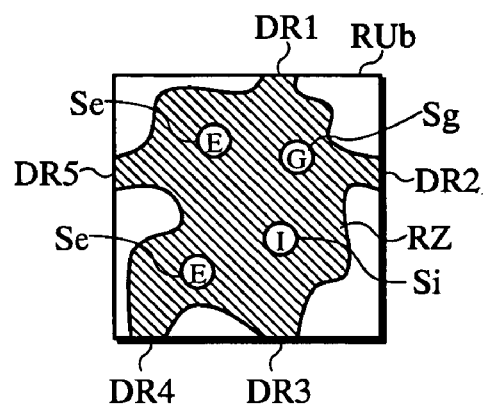
FIG. 4B is an illustration showing one example of a room unit RUb included in the room unit image group stored in the unit storage area 322 of FIG. 3.
Figure 4C:
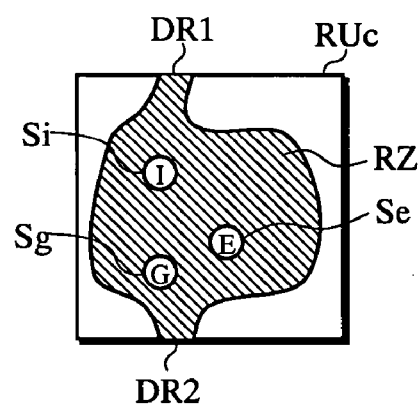
FIG. 4C is an illustration showing one example of a room unit RUc included in the room unit image group stored in the unit storage area 322 of FIG. 3.
Figure 4D:
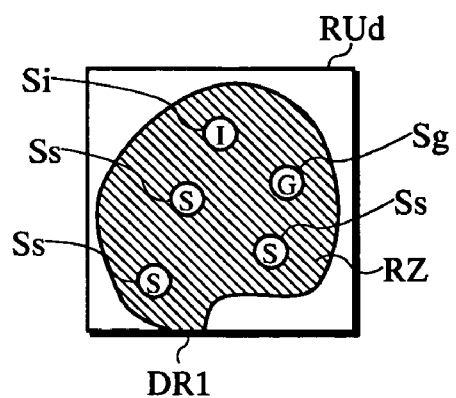
FIG. 4D is an illustration showing one example of a room unit RUd included in the room unit image group stored in the unit storage area 322 of FIG. 3.

In FIGS. 4A-4C, the unit storage area 322 has stored therein a plurality of room units RU forming the room unit image group. The room unit RU is a unit zone forming a map together with passage units PU and a cap unit CU, which will be described further below. For example, the room unit RU is formed as a rectangular area, and includes a room zone RZ in which an object, such as the player object, can move or can be disposed. In FIGS. 4A-4C, the room zone is represented as a hatched area. The room zone RZ is formed so as to be at least partially in contact with the boundary of the rectangular area of the room unit RU to form a line segment having a predetermined length. The line segment in contact with the boundary is set with the door DR. The door DR is merely an example of a connecting portion for connection with another unit.

For example, in a room unit RUa illustrated in FIG. 4A having four sides indicating boundaries of the rectangular area, its room zone RZ is in contact with each of the four sides at one point, where a door is set. That is, doors DR1 through DR4 are set on the sides of the room unit RUa. In a room unit RUb illustrated in FIG. 4B, its room zone RZ is in contact with each side of the room unit RUb at one or more points, where a door is set. That is, doors DR1 through DR5 are set at five points on the sides of the room unit RUb, where the doors DR3 and DR4 of the room unit RUb are set on the same side.

In a room unit RUc illustrated in FIG. 4C, its room zone RZ is in contact with each of two sides of the room unit RUc that are opposite to each other at one point, where a door is provided. That is, doors DR1 and DR2 are set on these two sides. In a room unit RUd illustrated in FIG. 4D, its room zone RZ is in contact with one side of the room unit RUd at one point, where a door DR1 is set.

As such, the room unit RU has formed therein a room zone RZ having an arbitrary shape according to the type of the unit. At least one door DR having the predetermined length is set to at least one of those four sides of the room unit RU. Here, as illustrated in the examples of the room unit RU, some of the four sides of the room unit RU are not set with a door DR, and some are set with a plurality of doors DR.

Also, the room unit RU has set inside the room zone RZ a point at which an additional component, such as a start point and a goal point of the map, an enemy character, and an item, that may possibly be disposed. Such a point is hereinafter referred to as a slot for description. Specifically, a point at which a start point may possibly be disposed is referred to as a start slot Ss, a point at which a goal point may possibly be disposed is referred to as a goal slot Sg, a point at which an enemy character may possibly be disposed is referred to as an enemy slot Se, and a point at which an item may possibly be disposed is referred to as an item slot Si. Here, the above enemy character is a character typically interfering with the encountered player object moving on the map, and has its strength set thereto as an attribute value. Therefore, disposition of the enemy character on the map makes it difficult for the player object to pass through the vicinity of the place where the enemy character is disposed, thereby increasing the degree of difficulty in passing through that place in accordance with the attribute value. On the other hand, the item is typically a target which increases the score or the capability of the player object or which is to be collected to win the map. Therefore, the point where the item is disposed on the map is one target point to be reached by the player object.

Here, at lest one goal slot Sg is always set inside the room zone RZ formed in the room unit RU. For example, inside the room zone RZ formed in the room unit RUa illustrated in FIG. 4A, two start slots Ss, one goal slot Sg, one enemy slot Se, and one item slot Si are set. Inside the room zone RZ formed in the room unit RUb illustrated in FIG. 4B, two enemy slots Se, one goal slot Sg, and one item slot Si are set. Inside the room zone RZ formed in the room unit RUc illustrated in FIG. 4C, one goal slot Sg, one enemy slot Se, and one item slot Si are set. Inside the room zone RZ formed in the room unit RUd illustrated in FIG. 4D, three start slots Ss, one goal slot Sg, and one enemy slot Si are set.

In FIG. 5, the room unit table stored in the unit storage area 322 has stored therein data for each room unit RU included in the above-described room unit image group. For example, the room unit table has stored therein, for each room unit RU, its size, a setting position of the door(s) DR, the number of slots, etc. The size of the room unit RU is equivalent to the size of the above-described rectangular area, and is represented by a multiple of the size of a reference unit of 1×1. For example, the above-described room units RUa through RUd each have the size of 4×4. Note that the size of any of the room units RU is hereinafter represented with reference to a value of 1×1, which represents the size of the reference unit.

The setting position of each door DR set to the room unit RU is represented by using characters a through d respectively denoting the four sides of the room unit RU (for example, the upper side of the room unit RU is denoted as a side a, the right side thereof as a side b, the lower side thereof as a side c, and the left side thereof as a side d), each character being provided with a numerical value indicative of a position on the corresponding one of the sides a through d where a door DR is set. The numerical value indicative of the position represents a distance from one end of the side where the door DR is set. For example, when the upper side of the room unit RUa illustrated in FIG. 4A is denoted as a side a and the door DR1 is set at the second reference unit from the left end on the side a of the room unit RUa, the setting position of the door DR1 is denoted as "a1", which is stored in the room unit table. The number of slots set in the room unit RU includes the number of start slots Ss, the number of goal slots Sg, the number of enemy slots Se, and the number of item slots Si. The CPU 31 refers to this room unit table to obtain data of each room unit RU required for map generation, which will be described further below, without the need for performing image analysis on the room unit image group every time map generation is performed.

In FIGS. 6A-6C, door-to-door distance tables for the room units stored in the unit storage area 322 each contain distance data indicative of a distance(s) between the doors DR set in the relevant room unit. For example, FIGS. 6A-6C illustrate door-to-door distance tables for the room units RUa through RUc illustrated in FIGS. 4A-4C, respectively. As evident from comparison between FIGS. 4A-4C and FIGS. 6A-6C, as the distance between the doors DR is longer, distance data has a relatively large value based on a predetermined rule. For example, in the room unit RUa, the distance between the doors DR2 and DR3, which is the longest, corresponds to distance data of "11" on the door-to-door distance table, and the distance between the doors DR3 and DR4, which is the shortest, corresponds to distance data of "3" on the door-to-door distance table. Therefore, when the player object moves between two doors DR set in the room unit RU, the player feels that the distance between two doors DR is longer as the distance data set therebetween is larger. Note that the room unit RUd is set with only one door DR, and therefore a door-to-door distance table is not necessarily required. The CPU 31 refers to the door-to-door distance tables for the room units to obtain the distance data, which is required for a game element disposition process described further below, for the door(s) provided to each room unit RU without the need for performing image analysis on the passage unit image group every time map generation is performed.

With reference to FIGS. 7A-7E, 8, and 9, the passage unit image group, the cap unit image, the passage unit table, and the cap unit table, and the door-to-door distance table are described below. FIGS. 7A-7D are illustrations showing examples of a passage unit included in the passage unit image group stored in the unit storage area 322, and FIG. 7E is an illustration showing one example of a cap unit CU included in the cap unit image stored in the unit storage area 322. FIG. 8 is an illustration showing one example of the passage unit table. FIG. 9 is an illustration showing one example of the cap unit table. FIGS. 10A-10D are illustrations showing examples of the door-to-door distance table for the passage units.

In FIGS. 7A-7D, the unit storage area 322 has stored therein a plurality of passage units PU as the passage unit image group. For example, the passage unit PU is formed as a rectangular area, and includes a passage unit zone PZ having an arbitrary shape in which the player object can move. In FIG. 7E, the unit storage area 322 has stored therein at least one cap unit CU as a cap unit image. For example, the cap unit CU is formed as a rectangular area, and includes a passage zone PZ having an arbitrary shape in which the player object can move. In FIGS. 7A-7E, each passage zone PZ is represented as a hatched area. The passage zone PZ is formed so as to be at least partially in contact with the boundary of the rectangular area of the passage unit PU or the cap unit CU to form a line segment having a predetermined length. The line segment in contact with the boundary is set with a door DR. Note that the length of the line segment in the passage unit PU or the cap unit CU is equal to the above-described length of the line segment in the room unit RU.

For example, in a passage unit PUa illustrated in FIG. 7A having four sides indicating boundaries of the rectangular area, its passage zone PZ is in contact with two of the four sides that are opposite to each other at one point, where a door is set. That is, doors DR1 and DR2 are set on the two sides of the passage unit PUa. In a passage unit PUb illustrated in FIG. 7B, its passage zone PZ is in contact with two of the four sides that are adjacent to each other at one point, where a door is set. That is, doors DR1 and DR2 are set on the two sides of the passage unit PUb. In a passage unit PUc illustrated in FIG. 7C, its passage zone PZ is in contact with the four sides at one point, where a door is set. That is, doors DR1 through DR4 are set on the four sides of the passage unit PUc. In a passage unit PUd illustrated in FIG. 7D, its passage zone PZ is in contact with three of the four sides at one point, where a door is set. That is, doors DR1 through DR3 are set on the three sides of the passage unit PUd. In the cap unit CU illustrated in FIG. 7E having four sides indicating boundaries of the rectangular area, its passage zone PZ is in contact with one of the four sides at one point, where a door DR1 is set.

As such, the passage unit PU and the cap unit CU each have formed therein the passage zone PZ having an arbitrary shape according to the type of the unit. In the passage unit PU, at least two doors DR each having the predetermined length are set to at least two of those four sides. By contrast, in the cap unit CU, one door DR having the predetermined length is set to only one of those four sides. That is, the passage unit PU is different from the cap unit CU in the number of doors that can be set: the cap unit CU can be defined as a passage unit where only one door DR can be set. However, in the following description, the cap unit CU is differentiated from the passage unit PU for clear distinction between the two. Also, the room unit RU, the passage unit PU, and the cap unit CU are collectively referred to as units.

In FIG. 8, the passage unit table stored in the unit storage area 322 has stored therein data for each passage unit PU included in the above-described passage unit image group. For example, the passage unit table has stored therein, for each passage unit PU, its size, a setting position of each door DR, etc. The size of the passage unit PU is equivalent to the size of the above-described rectangular area. For example, the above-described passage units PUa through PUd each have the size of a reference unit of 1×1. The setting position of each door DR set to the passage unit PU is represented by using characters a through d respectively denoting the four sides of the passage unit PU, each character being provided with a numerical value indicative of a point on the corresponding one of the sides a through d where the door DR is set. The numerical value indicative of the point represents a distance from one end of the side where the door DR is set. For example, when the upper side of the passage unit PUa illustrated in FIG. 7A is denoted as a side a and the door DR1 is set at the first reference unit from the left end on the side a of the passage unit PUa, the setting position of the door DR1 is denoted as "a1", which is stored in the passage unit table. The CPU 31 refers to this passage unit table to obtain data of each passage unit PU required for map generation, which will be described further below, without the need for performing image analysis on the passage unit image group every time map generation is performed.

In FIG. 9, the cap unit table stored in the unit storage area 322 has stored therein data for the cap unit CU included in the above-described cap unit image. For example, the cap unit table has stored therein, for the cap unit CU, its size, a setting position of the door DR, etc. The size of the cap unit CU is equivalent to the size of the above-described rectangular area. For example, the above-described cap unit CU has the size of a reference unit of 1×1. The setting position of the door DR set to the cap unit CU is represented by using characters a through d respectively denoting the four sides of the cap unit CU, each character being provided with a numerical value indicative of a point on the corresponding one of the sides a through d where the door DR is set. The numerical value indicative of the point represents a distance from one end of the side where the door DR is set. For example, when the lower side of the cap unit CU illustrated in FIG. 7E is denoted as a side c and the door DR1 is set at the first reference unit from the right end on the side c of the cap unit CU, the setting position of the door DR1 is denoted as "c1", which is stored in the cap unit table. The CPU 31 refers to this cap unit table to obtain data of the cap unit CU required for map generation, which will be described further below, without the need for performing image analysis on the cap unit image every time map generation is performed. Note that, as described above, the cap unit CU can be defined as a passage unit where only one door DR is set. Therefore, the data of the cap unit CU can be included in the above-described passage unit table.

In FIGS. 10A-10D, door-to-door distance tables for the passage units stored in the unit storage area 322 each contain distance data indicative of a distance(s) between the doors DR set in the relevant passage unit PU. For example, FIGS. 10A-10D illustrate door-to-door distance tables for the passage units PUa through PUd illustrated in FIGS. 7A-7D, respectively. As evident from comparison between FIGS. 7A-7D and FIGS. 10A-10D, as the distance between the doors DR is longer, distance data has a relatively large value based on a predetermined rule. For example, a distance between doors D provided on sides of the room unit RU that are opposite to each other corresponds to distance data of "2" on the door-to-door distance table. A distance between doors D provided on sides adjacent to each other corresponds to distance data of "1" on the door-to-door distance table. Note that the cap unit CU is set with only one door DR, and therefore a door-to-door distance table is not necessarily required. The CPU 31 refers to the door-to-door distance tables for the passage units to obtain the distance data, which is required for a game element disposition process described further below, for the door(s) provided to each passage unit PU without the need for performing image analysis on the passage unit image group every time map generation is performed.

Figure 11:
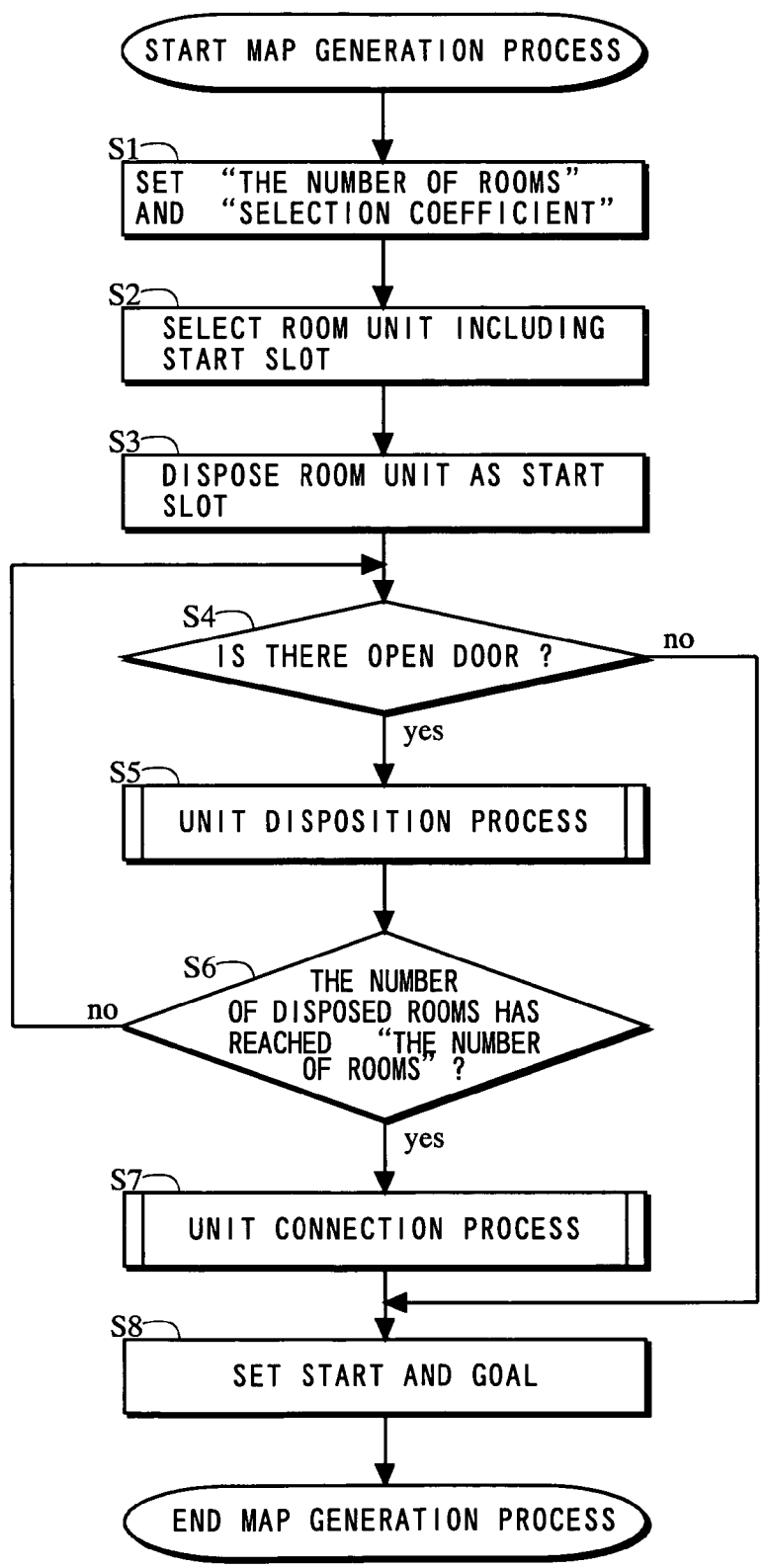
FIG. 11 is a flowchart showing the entire map generation process performed by a game machine 3 of FIG. 1.
Figure 12:
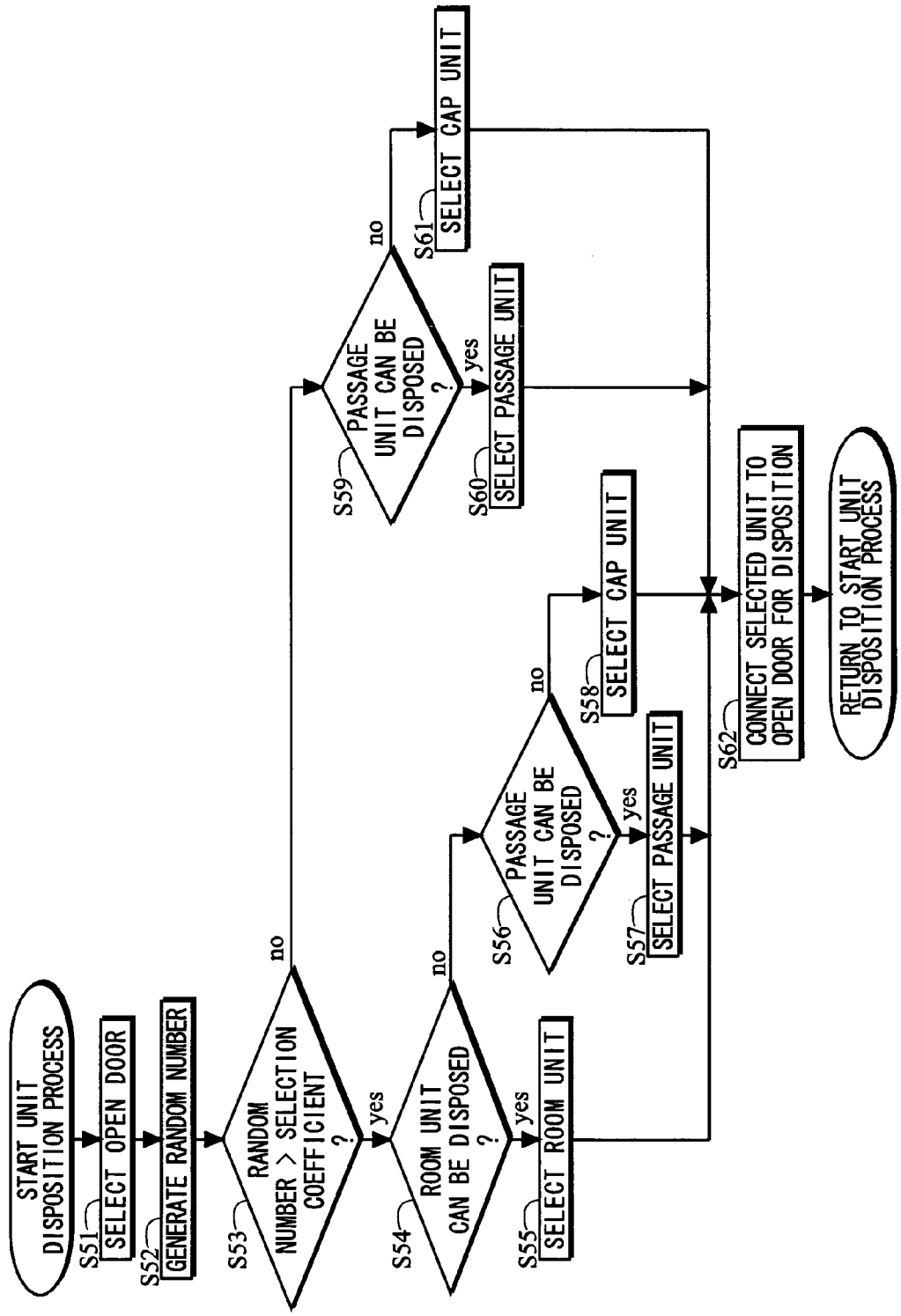
FIG. 12 is a subroutine showing the detailed operation of step S5 of FIG. 11.
Figure 13:
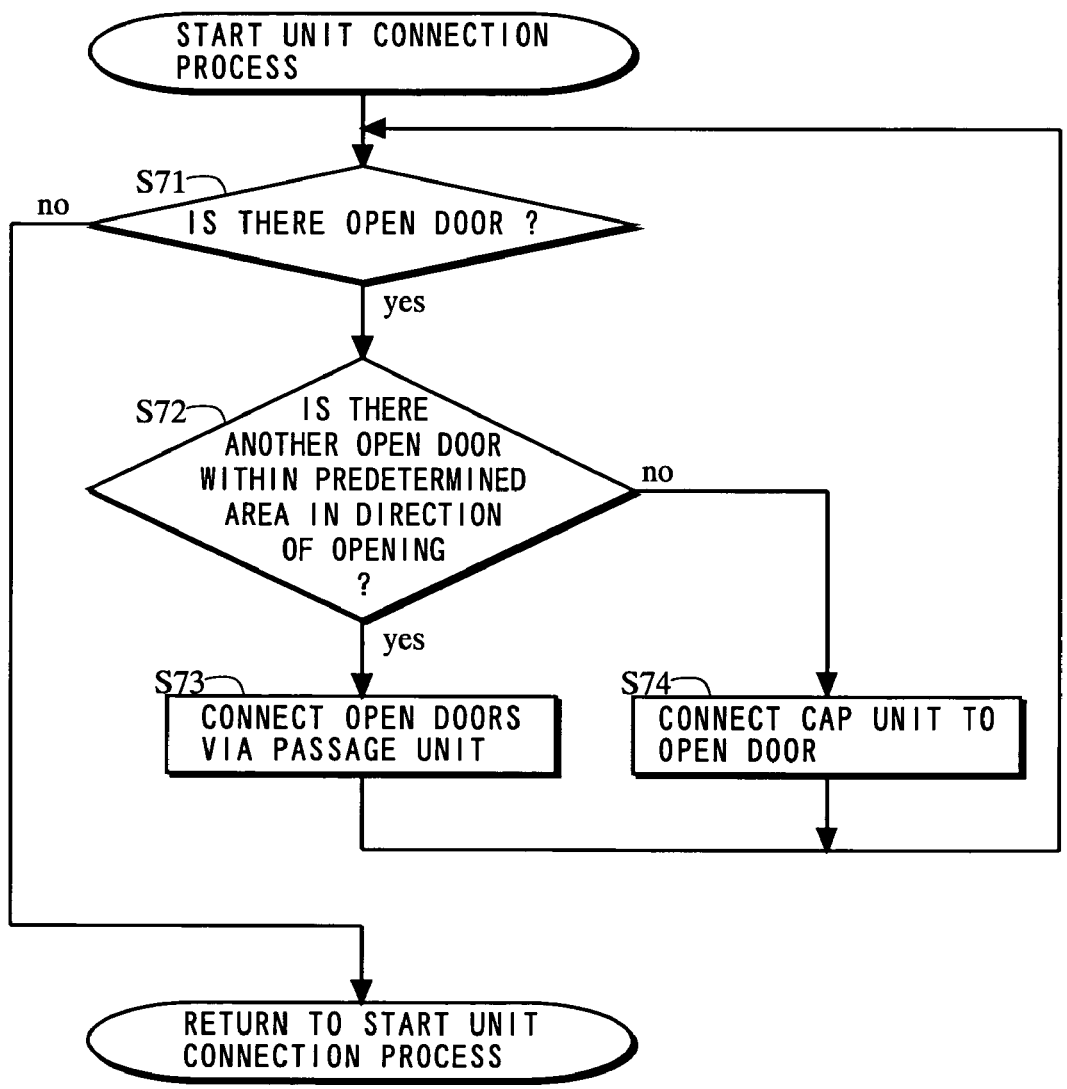
FIG. 13 is a subroutine showing the detailed operation of step S7 of FIG. 11.
Figure 14:
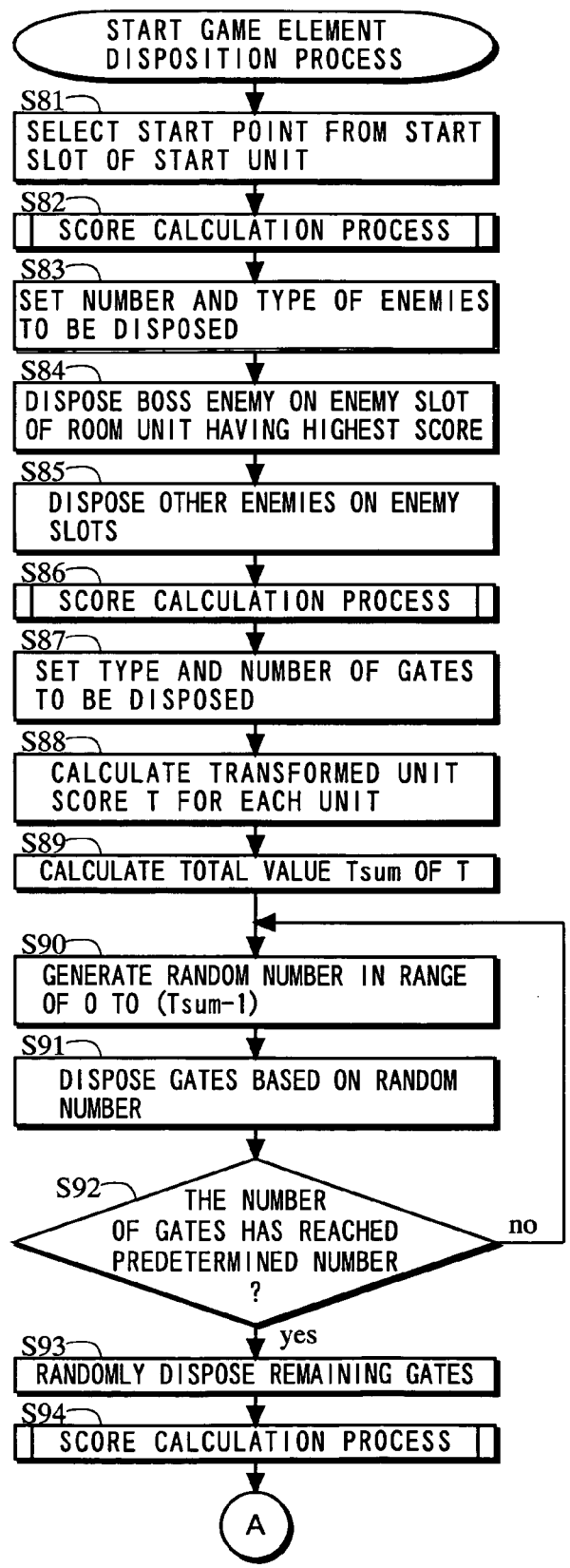
FIG. 14 is the first half of a subroutine showing the detailed operation of step S8 of FIG. 11.
Figure 15:
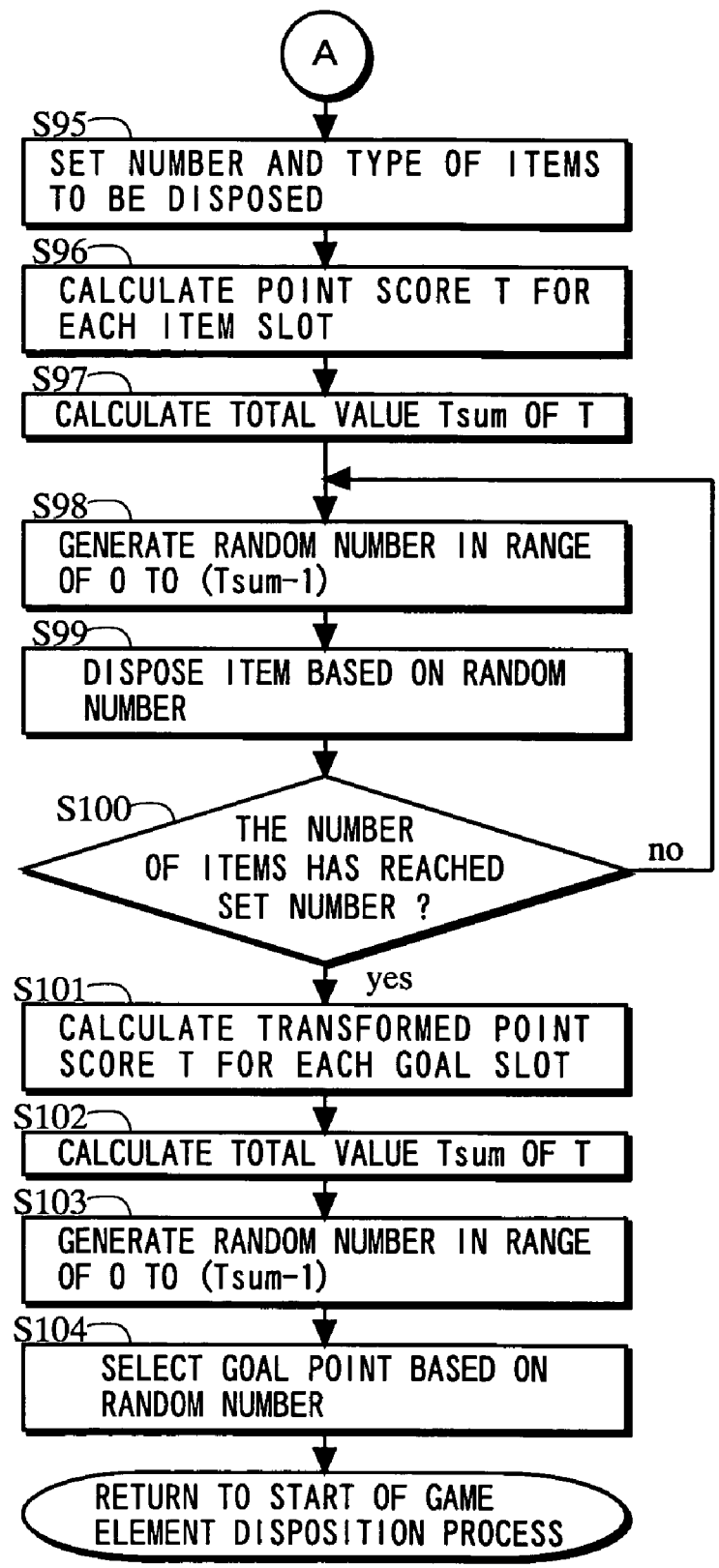
FIG. 15 is the latter half of the subroutine showing the detailed operation of step S8 of FIG. 11.
Figure 16:
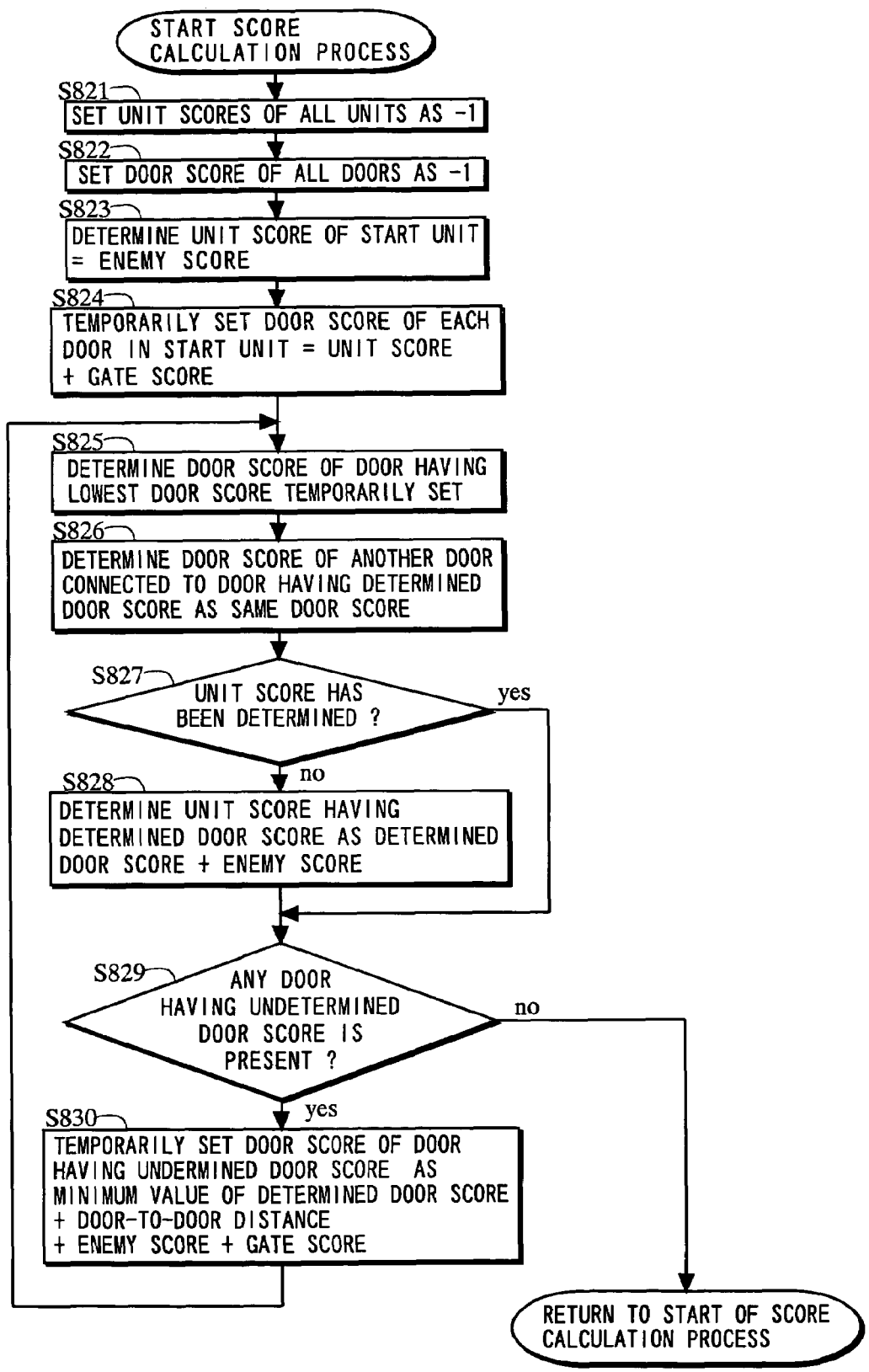
FIG. 16 is a subroutine showing the detailed operation of steps S82, S86, and S94 of FIG. 14.

With reference to FIGS. 11 through 16, a map generation process performed by the game machine 3 in the game system 1 is described below. FIG. 11 is a flowchart showing the entire map generation process performed by the game machine 3. FIG. 12 is a subroutine showing the detailed operation of a unit disposition process of FIG. 11. FIG. 13 is a subroutine showing the detailed operation of a unit connection process of FIG. 11. FIGS. 14 and 15 is a subroutine showing the detailed operation of a game element disposition process of FIG. 11. FIG. 16 is a subroutine showing the detailed operation of a score calculation process of FIG. 14.

When the game machine 3 is powered on, the CPU 31 of the game machine 3 executes the boot program stored in the boot ROM not shown to initialize each unit in the work memory 32, etc. The programs, such as the map generation program, and various data stored in the optical disc 4 are then read to the work memory 32, thereby starting execution of the map generation program.

In FIG. 11, the CPU 31 sets the number of rooms RN and a selection coefficient SF (step S1), and then goes to the next step. The number of rooms RN is the number of room units RU that can be disposed on a map to be generated in accordance with the map generation program. The selection coefficient SF is a coefficient for controlling the type of units to be connected to each other, and is set to a numerical value in a range of 0 to 1 in the present exemplary illustrative non-limiting implementation, which will be described further below in detail. The number of rooms RN and the selection coefficient SF may be automatically set by the CPU 31 in accordance with a program, or may be manually set by the player operating the controller 6.

Next, the CPU 31 refers to the room unit table stored in the unit storage area 322 to select a room unit RU including a start slot Ss (step S2). The CPU 31 then extracts from the room unit image group stored in the unit storage area 322 an image corresponding to the room unit RU selected in the above step S2, disposes the room unit on a predetermined virtual plane (which is an area on the work memory 32 of FIG. 2 and is hereinafter referred to as a map area) for generating a game map (step S3), and then goes to the next step. Here, the CPU 31 can dispose the room unit RU rotated by 90 degrees on the map area. That is, when a rotation angle of the room unit RU illustrated in any of FIGS. 4A-4D is taken as 0 degree, the CPU 31 can cause each room unit RU to be rotated by 90 degrees, 180 degrees, or 270 degrees clockwise for disposition on the map area. With this, it is possible to increase the diversity of room units while suppressing the amount of data. Note that the CPU 31 randomly selects an angle as the rotation angle of the room unit RU used in the above step S3 from 0 degree, 90 degrees, 180 degrees, and 270 degrees.

Next, the CPU 31 determines whether there is an open door among the doors DR set in the unit already disposed on the map area (step S4). Here, the open door is a door DR that has been set in the above-described room unit RU or the passage unit PU and has not yet been connected to any door DR of another unit. If there is an open door, the CPU 31 goes to step S5. If there is no open door, the CPU 31 goes to step S8.

In step S5, the CPU 31 performs a process of disposing a new unit on the map area, and then goes to step S6. With reference to the subroutine showing the detailed operation of this unit disposition process in FIG. 12, the detailed operation performed in this step S5 is described below.

In FIG. 12, the CPU 31 randomly selects one open door of the unit already disposed on the map area (step S51), and then goes to the next step. In some cases, a passage unit PU has been set on the map area in a unit disposition process, which will be described further below. Also, in some cases, in step S51, a door DR of not only the room unit RU but also the passage unit PU may be selected as an open door.

Next, the CPU 31 executes the random number generation program to generate a random number within a predetermined range (for example, 0 to 1) (step S52), and then goes to the next step.

Next, the CPU 31 determines whether the random number generated in the above step S52 is larger than the selection coefficient SF selected in step S1 (step S53). If the open door selected in step S51 is a door DR set in a room unit RU, the CPU 31 multiplies the selection coefficient SF by a predetermined multiplication factor M of 1 or larger (1.5, for example), and compares the random number with the multiplication result in step S53. If the random number is larger than the selection coefficient SF, the CPU 31 goes to step S54. If the random number is not larger than the selection coefficient SF, the CPU 31 goes to step S59.

Figure 17:
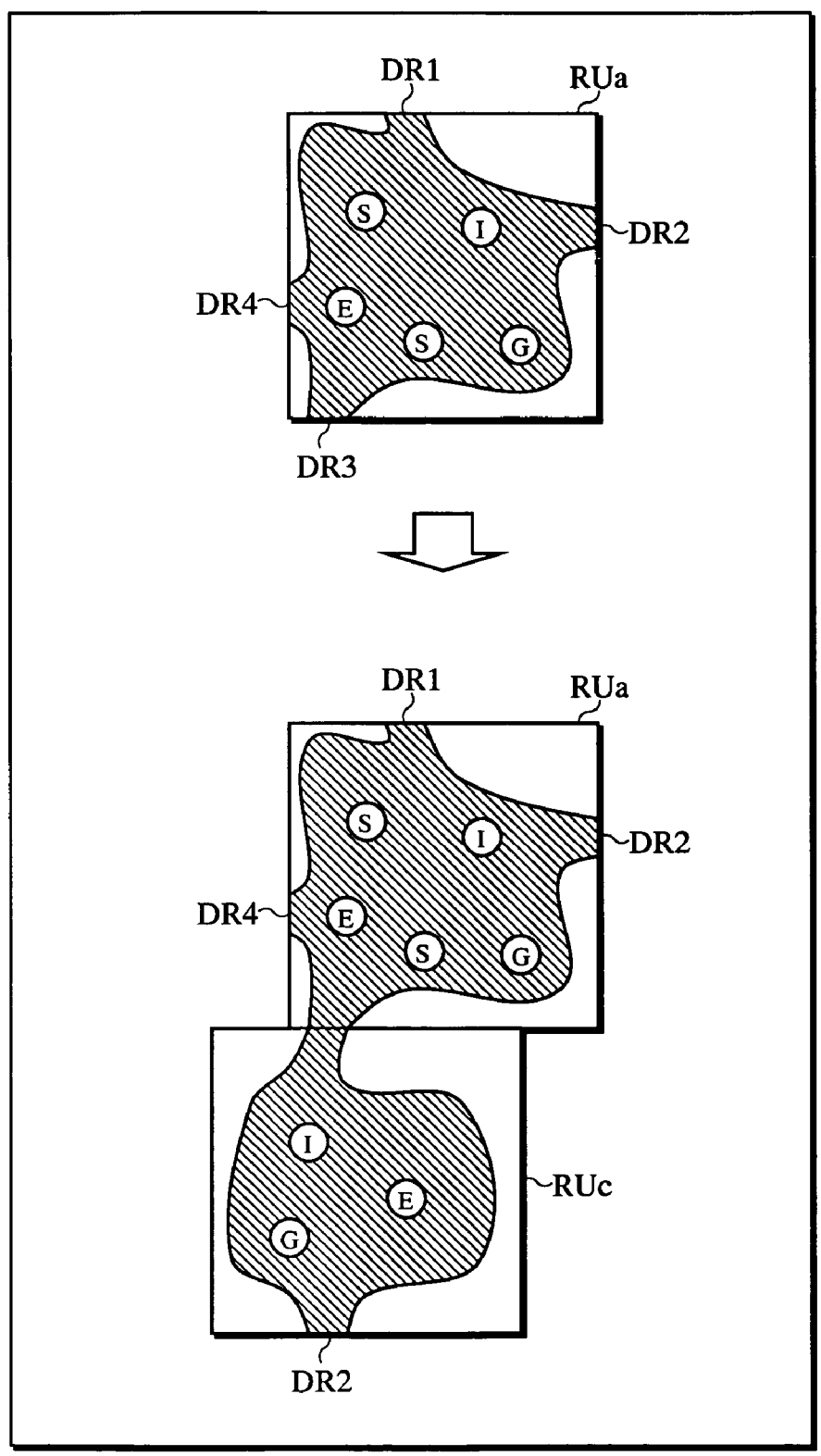
FIG. 17 is an illustration showing one example in which a door DR3 of the room unit RUa disposed on a map area is set as a selected door, and the selected door is connected to a door DR1 of the room unit RUc for disposition.

In step S54, the CPU 31 determines whether the room unit image group includes a room unit RU which can be disposed so as to be connected to the open door selected in step S51. In the following description, the open door selected in step S51 is referred to as a "selected door". Here, determination to be made by the CPU 31 in step S54 is described in detail below. The room unit RU to be newly disposed is disposed so that the door DR set in that room unit RU and the selected door DR are connected to each other. FIG. 17 illustrates one example in which the door DR3 of the room unit RUa already disposed on the map area is selected in step S51 and the selected door DR3 is connected to the door DR1 of the room unit RUc which is to be newly disposed. Determination that the room unit RU cannot be disposed is made in any of the following (1) through (3) cases. That is, if a room unit RU is disposed so that any door(s) DR of the room unit RU and the selected door are connected to each other, (1) the room unit RU and another unit already disposed on the map area will overlap each other, (2) an open door other than the door DR connected to the selected door of the room unit RU will be in contact with another unit already disposed on the map area, and therefore will become unconnectable, or (3) disposition of the room unit RU will cause an open door of the unit already disposed to be unconnectable. Determination of whether the room unit RU can be disposed is made also for each of the room units RU obtained after rotated by 90 degrees, 180 degrees, and 270 degrees. Therefore, determination of whether the room unit RU can be appropriately disposed with its door DR being connected to the selected door is made for all the doors DR set to the room unit RU. The CPU 31 makes such determination by referring to the data including the size of each room unit RU and the setting position of each door DR stored in the room unit table. If the room unit image group includes even one room unit RU that can be disposed, the CPU 31 goes to step S55. If the room unit image group includes no such room unit RU, the CPU 31 goes to step S56.

In step S55, the CPU 31 randomly selects one room unit RU from the room units RU that are determined in step S54 as being able to be disposed. The CPU 31 then goes to step S62.

On the other hand, in step S56, the CPU 31 determines whether the passage unit image group includes a passage unit PU that can be disposed so as to be connected to the selected door. Here, determination to be made by the CPU 31 in step S56 is described in detail below. The passage unit PU to be newly disposed is disposed so that the door DR set in that passage unit PU and the selected door DR are connected to each other. FIG. 18 illustrates one example in which the door DR3 of the room unit RUa already disposed on the map area is selected in step S51 and the selected door DR3 is connected to the door DR2 of the passage unit PUb which is to be newly disposed. Determination that the passage unit PU cannot be disposed is made in a manner similar to that described in step S54 in the case of the room unit RU. If the passage unit image group includes even one passage unit PU that can be disposed, the CPU 31 goes to step S57. If the passage unit image group includes no such passage unit PU, the CPU 31 goes to step S58.

In step S57, the CPU 31 randomly selects one passage unit PU from the passage units PU that are determined in step S56 as being able to be disposed, and then goes to step S62. On the other hand, in step S58, the CPU 31 selects a cap unit CU, and then goes to step S62.

As described above, in step S53, if the random value is not larger than the selection coefficient SF, the CPU 31 goes to step S59. In step S59, the CPU 31 determines whether the passage unit image group includes a passage unit PU that can be disposed to the selected door. If the passage unit image group includes even one passage unit PU that can be disposed, the CPU 31 goes to step S60. If the passage unit image group includes no such passage unit PU, the CPU 31 goes to step S61. The operation of this step S59 is similar to that of the above-described step S56, and therefore is not described in detail herein.

In step S60, the CPU 31 randomly selects one passage unit PU from the passage units PU determined in step S59 as being capable of being disposed. The CPU 31 then goes to step S62. On the other hand, in step S61, the CPU 31 selects the cap unit CU, and then goes to step S62.

In step S62, the CPU 31 then causes the unit selected in any of steps S55, S57, S58, S60, and S61 so that the door DR of that unit and the selected unit are connected to each other. Here, if the unit selected in any of the above steps includes a plurality of doors DR connectable to the selected door, the CPU 31 randomly selects one of the plurality of such doors DR. The CPU 31 then ends the subroutine of the unit disposition process to go to step S6 of FIG. 11.

Figure 19:
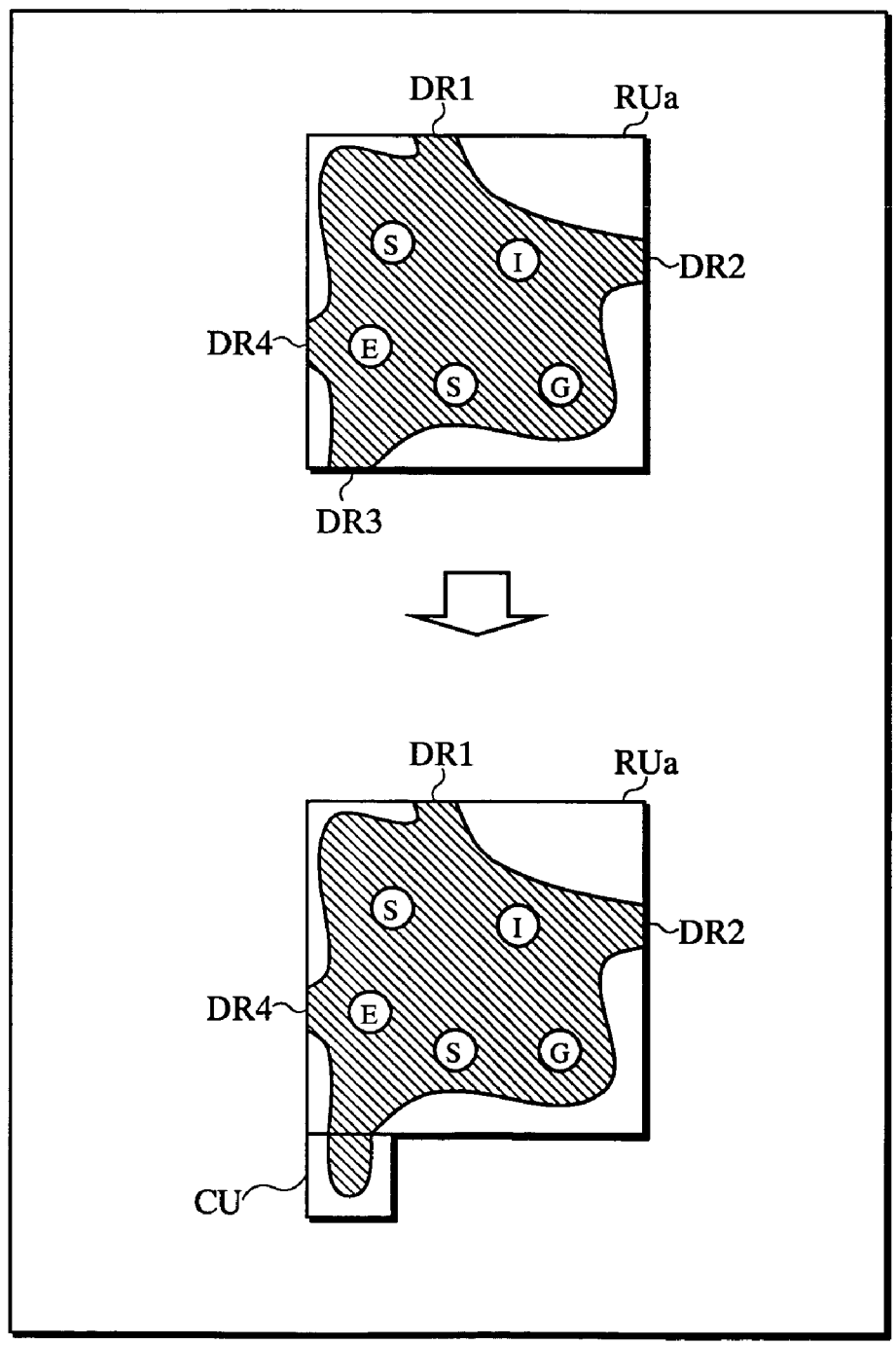
FIG. 19 is an illustration showing one example in which the door DR3 of the room unit RUa disposed on the map area is set as a selected door, and the selected door is connected to a door DR1 of the cap unit CU for disposition.

For example, as illustrated in FIG. 17, when the door DR3 of the room unit RUa is set as a selected door and the room unit RUa is disposed so that the selected door is connected to the door DR1 of the room unit RUc, the room unit RUa and the room unit RUc are disposed so that their sides that are opposite to each other are at least partially in contact with each other. In another example, as illustrated in FIG. 18, when the door DR3 of the room unit RUa is set as a selected door and the room unit RUa is disposed so that the selected door is connected to the door DR1 of the passage unit PUb, the room unit RUa and the passage unit PUb are disposed so that their sides that are opposite to each other are at least partially in contact with each other. In still another example, as illustrated in FIG. 19, when the door DR3 of the room unit RUa is set as a selected door and the room unit RUa is disposed so that the selected door is connected to the door DR1 of the cap unit CU, the room unit RUa and the cap unit CU are disposed so that their sides that are opposite to each other are at least partially in contact with each other. As illustrated in FIGS. 17 through 19, when units are connected to each other via their doors DR, the room zones RZ or the passage zones PZ formed in these units are connected to each other via their doors DR. Since these doors DR have an equal length (that is, the predetermined length of the line segment), the zones are connected without a dimensional difference. Also, as illustrated in FIG. 19, when the cap unit CU is connected via the door DR to the unit disposed on the map area, the room zone RZ or the passage zone PZ formed in the unit disposed on the map area forms a closed area (dead end) via its door DR.

Here, consider steps S53 through S61 illustrated in FIG. 12. The CPU 31 determines in step S53 whether the random number is larger than the selection coefficient SF. If the random number is larger than the selection coefficient SF, the CPU 31 determines in step S54 whether there is a room unit RU that can be disposed. If the random number is not larger than the selection coefficient SF, the CPU 31 determines in step S59 whether there is a passage unit PU that can be disposed. That is, if the random number is larger than the selection coefficient SF, the CPU 31 gives a higher priority to the room unit RU for disposition on the map area. If the random number is not larger than the selection coefficient SF, the CPU 31 does not cause the room unit RU to be disposed on the map area. As such, depending on the value of the selection coefficient SF, a ratio of the room units RU to be disposed on the map area can be controlled. Specifically, if the selection coefficient SF is set to be smaller than a median value of a range of possible random numbers, the ratio of the room units RU to be disposed on the map area is large. If the selection coefficient SF is set to be larger than the median value of that range, the ratio of the room units RU to be disposed on the map area is small.

On the other hand, if the open door selected in step S51 is a door DR set in a room unit RU, the CPU 51 multiplies the selection coefficient SF by the predetermined multiplication factor M of 1 or larger, and then compares the random number with the multiplication result in step S53. Therefore, as the multiplication factor M is larger, the selection coefficient SF with which the random number is compared is larger, thereby increasing the possibility that the CPU 31 goes to the step S59. That is, as the multiplication factor M is larger, the passage unit PU is given a higher priority for disposition on the map area. Therefore, with the value of the multiplication factor M, the type of the unit that is connected to the room unit RU already disposed on the map area can be controlled. Specifically, by setting the multiplication factor M to be small, the possibility that the room units RU are connected together on the map area can be increased. On the other hand, by setting the multiplication factor M to be large, the possibility that a passage unit PU is connected to the room unit RU on the map area can be increased.

As such, with the selection coefficient SF, the ratio of the units of two types disposed on the map area can be controlled. Also, with the multiplication factor M, the possibility of disposition in which a unit of one type is connected to a unit of the other type can be controlled. That is, by adjusting the selection coefficient SF and the multiplication factor M, it is possible to generate a map in consideration of the ratio of the units of two types disposed on the map area and the affinity for connection between the units of two types.

In the above description, the selection coefficient SF is set so as to be commonly used for all units. Alternatively, different selection coefficients SF can be set for the units or the doors DR provided thereto. With this, it is possible to generate a map in consideration of the affinity among the units.

Referring back to FIG. 11, in step S6, the CPU 31 determines whether the number of room units RU disposed on the map area has reached the number of rooms RN set in step S1. If the number of room units RU has not reached the number of rooms RN, the CPU 31 returns to step S4 for further processing. If the number of room units RU has reached the number of rooms RN, the CPU 31 goes to step S7.

In step S7, the CPU 31 performs a process of connecting the open doors of the units disposed on the map area, and then goes to step S8. With reference to a subroutine showing the detailed operation of this unit connection process, the operation in this step S7 is described in detail below.

In FIG. 13, the CPU 31 determines whether there is an open door among the doors DR set in the unit already disposed on the map area (step S71). The operation in this step S71 is similar to that in step S4, and therefore is not described herein. If there is an open door, the CPU 31 goes to step S72. If there is no open door, the CPU 31 ends the subroutine of the unit connection process.

In step S72, the CPU 31 selects one open door, and then determines whether there is another open door within a predetermined area in a direction of the opening of the open door (that is, in a direction opposite to the unit including the open door). If there is such another open door within the predetermined area, the CPU 31 goes to step S73. If there is no other open door, the CPU 31 goes to step S74.

Figure 20:
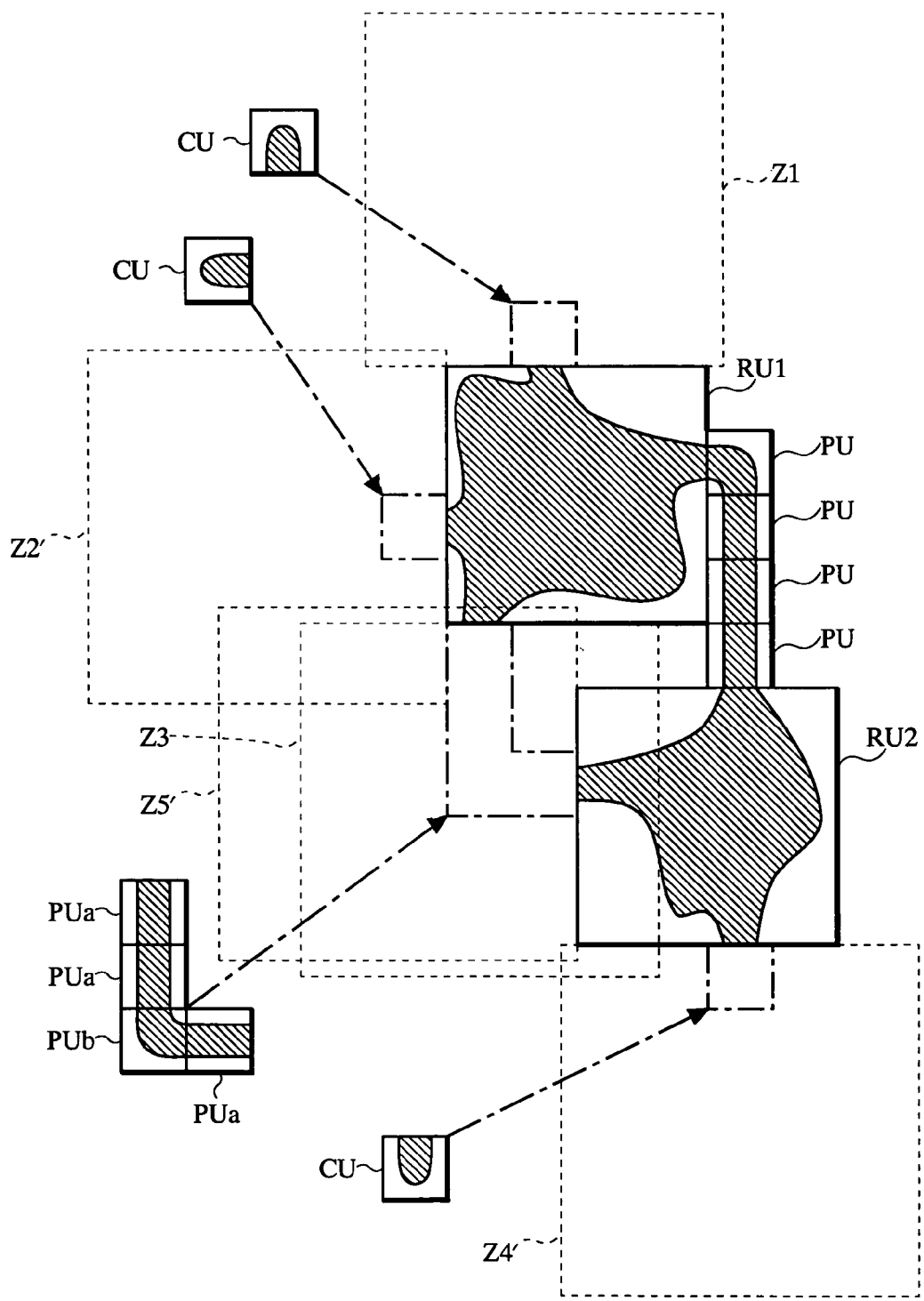
FIG. 20 is an illustration for describing one example of a unit connection process performed by a CPU 31 of FIG. 2.

In step S73, the CPU 31 connects the open door selected in step S72 to the other open door located within the predetermined area via a passage unit PU, disposes the connection result on the map area, and then returns to step S71 for further processing. On the other hand, in step S74, the CPU 31 connects the open door selected in step S72 to a cap unit CU, disposes the connection result on the map area, and then returns to step S71 for further processing. Here, with reference to FIG. 20, the processes performed by the CPU 31 in steps S72 through S74 are described below. FIG. 20 is an illustration for describing one example of the unit connection process performed by the CPU 31.

In FIG. 20, when Yes is determined in step S6 of FIG. 11, two room units RU1 and RU2 are connected to each other via four passage units PU and are disposed on the map area. Of these two room units RU1 and RU2, the room unit RU1 has three open doors. From these open doors toward the direction of their opening, zones Z1 through Z3 each having a size of 10×10 are shown. In step S72, since the zones Z1 and Z2 include no open door, the CPU 31 determines those zones Z1 and Z2 as "there is no other open door". The CPU 31 then causes cap units CU to be disposed in portions (each indicated by a one-dot-chain line inside each of the zones Z1 and Z2) so that the cap units CU are respectively connected to the open doors corresponding to the zones Z1 and Z2.

On the other hand, the zone Z3 includes one open door of the room unit RU2. Therefore, in step S72, the CPU 31 determines the zone Z3 as "there is another open door". The CPU 31 then connects, in step S73, the open door of the room unit RU1 corresponding to the zone Z3 to the open door of the room unit RU2 within the zone Z3 with a passage unit PU. For example, in FIG. 20, three passage units PUa and one passage unit PUb are combined so as to connect the room units RU1 and RU2 together for disposition on a portion (indicated by one-dot-chain lines inside the zone Z3) on the map area.

On the other hand, the room unit RU2 has two open doors. From these open doors toward the direction of their opening, zones Z4 and Z5 are shown. In step S72, since the zone Z4 includes no open door, the CPU 31 determines the zone Z4 as "there is no other open door". The CPU 31 then causes a cap unit CU to be disposed on a portion (indicated by a one-dot-chain line inside the zone Z4) so that the cap unit CU is connected to the open door corresponding to the zone Z4.

On the other hand, the zone Z5 includes one open door of the room unit RU1. Therefore, in step S72, the CPU 31 determines the zone Z5 as "there is another open door". The CPU 31 then connects, in step S73, the open door of the room unit RU2 corresponding to the zone Z5 to the open door of the room unit RU1 within the zone Z5 with a passage unit PU. Here, the results obtained by disposing the passage unit PU through the determination with regard to the zone Z5 are identical to those obtained by disposing the passage unit PU through the determination with regard to the zone Z3. In the operation performed by the CPU 31 in steps S72 and S73, either one of the open doors is to be processed first. Therefore, the remaining open door is not processed after the one of the open doors is processed.

Figure 21:
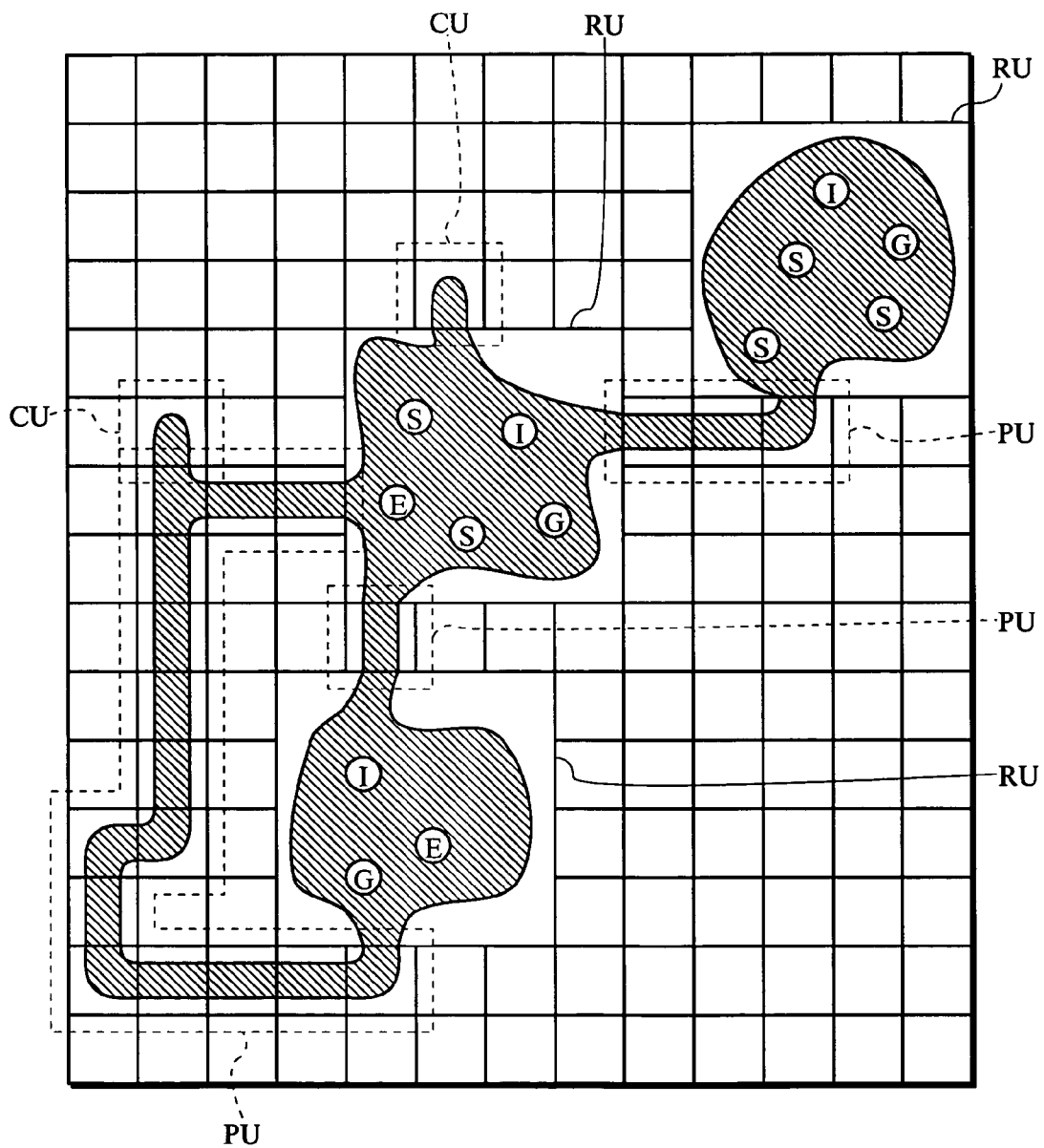
FIG. 21 is an illustration showing an example of a map generated by a map generation process performed by the CPU 31 of FIG. 2.

FIG. 21 is an illustration showing one example of the map generated in the map generation process. As illustrated in FIG. 21, in the map generation process, a new unit is always disposed on the map area so as to be connected to another unit. Therefore, all units are consecutive as one, and a map being divided into a plurality of groups is not generated. That is, areas where an object, such as the player object, can move or can be disposed are formed so as to be combined as one and to be closed.

Referring back to FIG. 11, in step S8, the CPU 31 performs the above game element disposition program to dispose the game element on the map generated by the processes up to the above step S7, and then ends the map generation process shown by the flowchart. With reference to a subroutine in FIGS. 14 and 15 showing the detailed operation of the game element disposition process, the detailed operation of step S8 is described below.

In FIG. 14, the CPU 31 selects one start slot Ss included in the room unit RU disposed in step S3 as the start unit, and then sets the start slot Ss at a start point of the generated map (step S81). The CPU 31 then goes to the next step.

The CPU 31 performs a score calculation process on each unit forming the generated map (step S82), and then goes to the next step. With reference to a subroutine of FIG. 16, the detailed operation of the score calculation process in this step S82 is described below.

In FIG. 16, the CPU 31 sets all unit scores Sc given to the units disposed on the map area as "-1" ("-1" indicates that the unit score Sc has not yet been set) (step S821), and then goes to the next step. Here, the unit score Sc is a numerical value given to each unit (the room unit RU, the passage unit PU, and the cap unit CU). This unit score Sc represents the distance to be traveled by the player object from the start unit to the relevant unit and the degree of difficulty in passing through that unit.

Next, the CPU 31 sets all door scores Scd given to the doors DR set in the units disposed on the map area as "-1" ("-1" indicates that the door score Scd has not yet been set (step S822), and then goes to the next step. Here, the door score Scd is a numerical value given to each door DR set in the room unit RU, the passage unit PU, and the cap unit CU disposed on the map area. The door score Scd represents the distance to be traveled by the player object from the start unit to the relevant door DR and the degree of difficulty in passing through that door DR. Note that, as has been described above, units are disposed by connecting the doors included in the units together and, at a connecting portion, two doors DR provided to two units overlap each other. The door score Scd is separately given to each of these two overlapping doors DR (however, as will be described further below, the door scores Scd of these two overlapping doors DR eventually become equal).

Next, the CPU 31 calculates a total of values indicative of strength of enemy characters disposed on the start unit (attribute values). This total is hereinafter referred to as an enemy score. The CPU 31 then determines this enemy score as the unit score Sc of the start unit (step S823), and then goes to the next step. This enemy score will be described further below.

Next, the CPU 31 temporarily sets the unit score Sc determined in step S823 as the door score Scd of all doors DR provided to the start unit (step S824), and then goes to the next step. Here, if the door DR provided to the start unit has disposed thereon a gate G, which will be described further below, a gate score of the gate G is added to temporarily set the door score Scd of that door DR. The gate score will be described further below in detail.

Next, the CPU 31 selects a door score Scd having a minimum value from the temporarily-set door scores Scd, and determines that minimum door score Scd as the door score Scd (step S825). Here, if there are a plurality of door scores Scd having the minimum value in step S825, the CPU 31 prioritizes, for example, the door score Scd of the unit disposed first on the map area in steps S3 through S7 for selection and determination of the door score Scd. The CPU 31 then gives the same door score Scd determined in step S825 to the other door DR connected and overlapped with the door DR having that door score Scd (step S826), and then goes to the next step.

Next, the CPU 31 determines whether the unit score Sc set in the unit including the door DR with the door score Scd determined in step S826 has been determined (step S827). If the unit score Sc has not been determined, the CPU 31 goes to step S826. If the unit score Sc has been determined, the CPU 31 goes to step S829.

In step S828, the CPU 31 calculates an enemy score of the enemy character disposed on the unit processed in step S827, adds the door score Scd determined in step S826 to the enemy score, determines the addition result as the unit score Sc of the unit, and then goes to step S829. Here, the unit score Sc is determined even when one door score Scd in a unit is determined and is then added with the enemy score. Therefore, the unit score Sc is determined based on the smallest one of the door scores Scd of the doors included in the unit. In the present exemplary illustrative non-limiting implementation, "unit score=(smallest) door score+enemy score". Thus, the unit score represents a value indicative of the degree of difficulty in arriving at the unit and then passing through the unit. Alternatively, "unit score=(smallest) door score". In this case, the unit score represents a value in no consideration of enemies present in the unit. Therefore, the value indicates the degree of difficulty in arriving at that unit.

In step S829, the CPU 31 determines whether the generated map contains a door DR whose door score has not yet been determined. If such a door DR is present, the CPU 31 goes to step S830. If all doors DR have their door scores Scd determined, the CPU 31 ends the subroutine of the score calculation process.

In step S830, the CPU 31 calculates the door score Scd which has not yet been determined for the unit whose unit score Sc has been determined. This calculation is based on the door score Scd already determined in the same unit. Then, the CPU 31 returns to step S825 for continuing the procedure. Specifically, when a door DR whose door score Scd has not yet been determined is taken as a door A and a door DR whose door score Scd has been determined is taken as a door B, calculation is performed as "door score Scd for the door A=door score Scd of the door B+door-to-door distance data of the doors A and B+enemy score+gate score". With the process of steps S821 through S829, the unit whose unit score Sc has been determined includes at least one door DR whose door score Scd has been determined. In step S830, for the door DR whose door score Scd has not yet been determined included in the unit, the CPU 31 extracts door-to-door distance data of that door and the door DR whose door score Scd has been determined, these doors being included in the same unit, from the above-described door-to-door distance table. The CPU 31 then adds the determined door score Scd and the door-to-door distance data together. Then, a total of values indicative of strength of enemy characters disposed on the unit (attribute values), that is, the enemy score, is added. Furthermore, if a gate G is set to the door DR whose door score Scd has not yet been determined, the gate score of that gate G is also added, thereby temporarily set the door score Scd. In the score calculation process in step S82, no enemy character or gate has yet been disposed, and therefore "door score Scd of the door A=door score Scd of the door B+door-to-door distance data of the doors A and B".

Also, the score calculation process is performed in steps S86 and S94, which will be described further below. However, in the score calculation process in step S86, no gate has yet been disposed. Therefore, "door score Scd of the door A=door score Scd of the door B+door-to-door distance data of the doors A and B+enemy score". On the other hand, in the score calculation process in step S94, "door score Scd of the door A=door score Scd of the door B+door-to-door distance data of the doors A and B+enemy score+gate score".

If a unit contains a plurality of doors DR whose door score Scd has been determined, each undetermined door score Scd is calculated based on each of these doors whose door score Scd has been determined. That is, when doors whose door score Scd has been determined are taken as a door B1 and a door B2, "door score Scd1 of the door A=door score Scd of the door B1+door-to-door distance data of the doors A and B1+enemy score+gate score" and "door score Scd2 of the door A=door score Scd of the door B2+door-to-door distance data of the doors A and B2+enemy score+gate score" are both calculated, and either of the door scores Scd1 and Scd2 which is smaller is then selected. The same goes for the case of three or more doors whose door score has been determined.

Figure 22A:
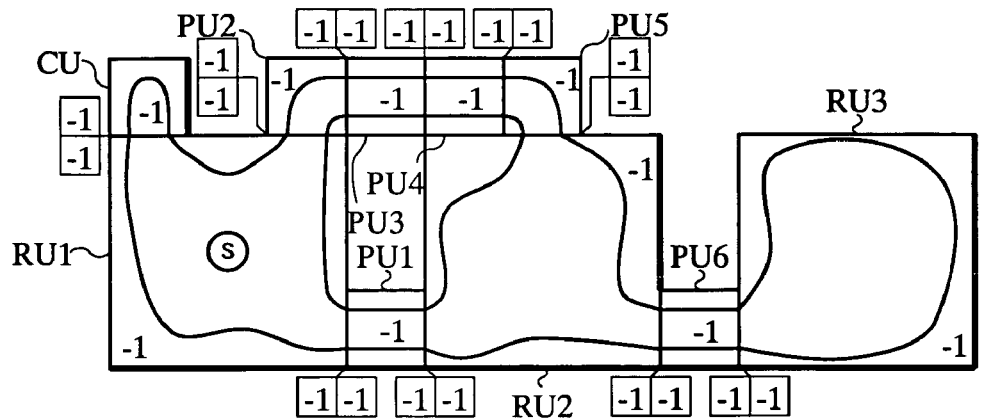
FIG. 22A is an illustration for describing a first stage of the first half of a score calculation process in step S82 of FIG. 14.

Here, with reference to FIGS. 22A-22C, 23A, and 23B, one example of the score calculation process in step S82 is described below. Note that FIGS. 22A-22C, 23A, and 23B illustrate the state in step S82, and therefore no enemy character or gate is disposed. FIG. 22A is an example of a map with unit scores Sc and door scores Scd being set. On this map, room units RU1 through RU3, passage units PU1 through PU6, and a cap unit CU are disposed. The room unit RU1 is a start unit with the cap unit connected thereto. Also, the room unit RU1 is connected to the room unit RU2 via one passage unit PU1. Furthermore, the room unit RU1 is connected to the room unit RU2 via four passage units PU2 through PU5, which form another route. Still further, the room unit RU2 is connected to the room unit RU3 via the passage unit PU6.

The room units RU1 through RU3, the passage units PU1 through PU6, and the cap unit CU each have set thereto "−1" as the unit score Sc. In FIGS. 22A-22C, 23A, and 23B, each unit contains a numerical value indicative of its unit score set thereto. Also, the doors DR set in the unit each have set thereto "−1" as the door score Scd. In FIGS. 22A-22C, 23A, and 23B, from each connecting portion of two units, a line is drawn to two boxes containing numerical values representing door scores Scd set to two doors DR overlapping at that connecting portion. Note that the numerical value shown on the left (upper) box with respect to the line represents the door score Scd set to the door DR disposed on the left (upper) side with respect to the connecting portion, while the numerical value shown on the right (lower) box with respect to the line represents the door score Scd set to the door DR disposed on the right (lower) side with respect to the connecting portion.

In the process of step S823, no enemy unit has been disposed in the start unit (room unit RU1). Therefore, the unit score Sc of the start unit is determined as "0". In FIGS. 22A-22C, 23A, and 23B, the determined unit score Sc and door score Scd are shown with numerical values as being underlined. In the process of step S824, no gate G is disposed in any door DR of the room unit RU1. Therefore, the door scores Scd of the room unit RU1 are all temporarily set as "0". These door scores Scd are all determined as "0" by repeating the processes of step S825 through S830. In the course of determination, the process of step S826 causes the door scores Scd of the doors DR of other units connected to the room unit RU1 to be all determined as "0". Also, the passage units PU1 and PU2 including these doors DR with the determined door scores and the cap unit CU each have its unit score Sc determined as "0". Also, the door score Scd which has not yet been determined of the door DR of the passage unit PU1 (that is, the door score Scd of the door DR connected to the room unit RU2) is temporarily set as "2" by adding the determined door score Scd of 0 of the door of the passage unit PU1 and the door-to-door distance data of "2" set to these two doors DR together. On the other hand, the door score Scd which has not yet been determined of the door DR of the passage unit PU2 (that is, the door score Scd of the door DR connected to the passage unit PU3) is temporarily set as "1" by adding the determined door score Scd of 0 of the door of the passage unit PU2 and the door-to-door distance data of "1" set to these two doors DR together (refer to the state of FIG. 22B). Note that, in FIGS. 22A-22C, 23A, and 23B, the temporarily-set numerical values of the door scores Scd are shown as being surrounded by a dotted line.

Figure 22B:
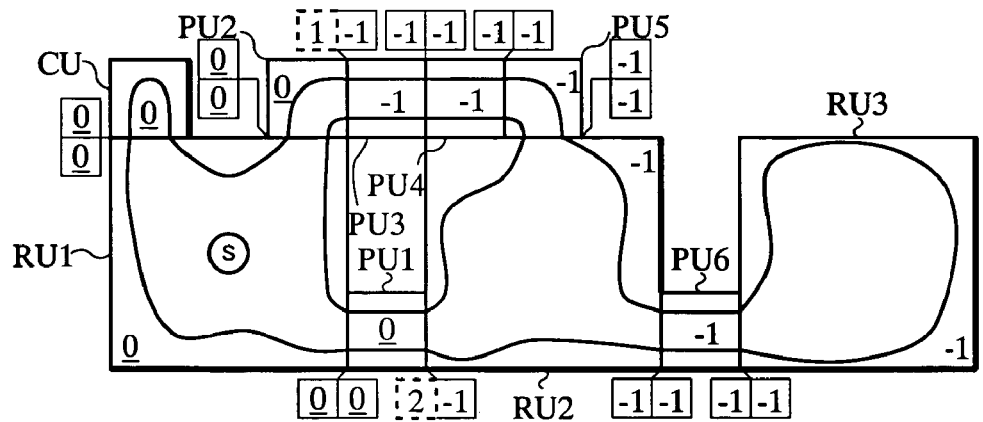
FIG. 22B is an illustration for describing a second stage of the first half of the score calculation process in step S82 of FIG. 14.
Figure 22C:
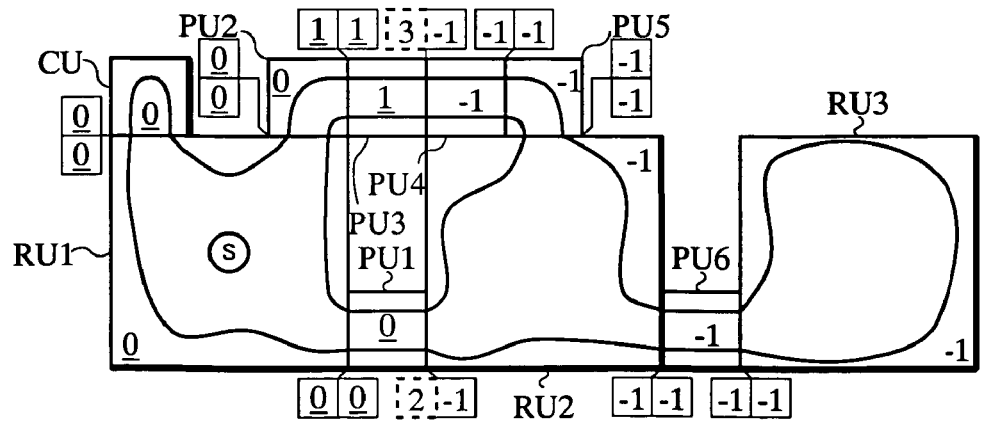
FIG. 22C is an illustration for describing a third stage of the first half of the score calculation process in step S82 of FIG. 14.

In step S825, in the case of the map shown in FIG. 22B, the door scores Scd of the door DR of the passage unit PU1 and the door DR of the passage unit PU2 are temporarily set as "2" and "1", respectively. In this case, the door score of the passage unit 2=1 is smaller than the other, and therefore the door score Scd of the passage unit PU2 is determined as "1". Next, in step S826, the door score Scd of the door DR of the passage unit PU3 connected to the door DR of the passage unit PU2 whose door score has been determined is determined so as to have the same value ("1"). Then, in step S828, the unit score Sc of the passage unit PU3 is determined as "1". Then, in step S830, the door score Scd which has not yet been determined of the passage unit PU3 (that is, the door score Scd of the door DR connected to the passage unit PU4) is temporarily set as "3" by adding "2" of the door-to-door distance data set to the doors DR of the passages units PU3 and PU4 to "1" of the door score Scd which has been determined of the passage unit PU3 (refer to the state of FIG. 22C). Then, in step S825, one of the temporarily-set door scores Scd ("2" of the door DR of the passage unit PU1 and "3" of the door DR of the passage unit PU3) that is smaller is determined as the door score Scd of the relevant door DR. Thereafter, such a process is repeated to determine the unit scores Sc and the door scores Scd.

FIG. 23A illustrates a state in which the unit score Sc of the room unit RU2 has been determined, and the door scores Scd of the two doors DR included in the room unit RU2 have been temporarily determined. At this time, the unit score Sc of the room unit RU2 has been determined as "2". The door score Scd of the room unit RU2 and the passage unit PU6 is temporarily determined as "8" by adding "6" of the door-to-door distance data indicative of "the doors DR of the room unit RU2 and the passage unit PU1" through "the doors DR of the room unit RU2 and the passage unit PU6" to "2" of the door score Scd of the doors DR of the room unit RU2 and the passage unit PU1. On the other hand, the door score Scd of "the door DR of the room unit RU2 and the passage unit PU5" is temporarily set as "9" by adding by adding "7" of the door-to-door distance data indicative of "the doors DR of the room unit RU2 and the passage unit PU1" through "the doors DR of the room unit RU2 and the passage unit PU5" to "2" of the door score Scd of the doors DR of the room unit RU2 and the passage unit PU1. In this state, when the step S825 is performed, the door score Scd=3 temporarily set to the door DR of the passage unit PU3 is determined as the door score Scd of that door DR.

FIG. 23B illustrates a state in which all unit scores Sc and the door scores Scd have been determined with the above-described processes being repeatedly performed. In FIG. 23B, the unit score Sc of the room unit RU1, which is the start unit, is determined as "0", while the unit score Sc of the room unit RU3 is determined as "10". Here, the room unit RU3 is disposed farthest away from the room unit RU1, and the unit score Sc of the room unit RU3 represents the distance from the start unit. Also, the door scores Scd are determined in a manner such that the smallest one of the temporarily-set door scores is prioritized. Therefore, the door scores Scd are determined in the order in which the door score Scd of the door DR closer to the start unit is determined earlier. Therefore, the door scores Scd and the unit scores Sc of the units are each represented by a numerical value indicative of the shortest distance from the start unit.

Referring back to FIG. 14, after the score calculation process of step S82, the CPU 31 sets the type and number of enemy characters to be disposed on the map (step S83). The CPU 31 then disposes an enemy character, which is the most important in the course of the game (hereinafter referred to as a boss enemy character) in an enemy slot Se included in the room unit RU whose unit score Sc is determined to have the largest value (step S84). For example, in the case of the map illustrated in FIG. 23B, the boss enemy character is disposed on the room unit RU3 whose unit score Sc is determined as 10, which is the largest value. When the room unit RU includes a plurality of enemy slots Se, the CPU 31 arbitrarily selects one of the enemy slots Se to dispose thereon the boss enemy character. Next, the CPU 31 disposes other enemy characters set in step S83 on an arbitrary enemy slot Se included in the room unit RU on the map (step S85), and then goes to the next step.

Next, the CPU 31 performs a score calculation process again on each of the units of the map where the enemy characters are disposed in steps S84 and S85 (step S86), and then goes to the next step. The reason for performing a score calculation again is that each door score Scd and unit score Sc is changed with the enemy characters being disposed. The score calculation process performed in step S86 is similar to that shown in FIG. 16 described above, and therefore is not described in detail herein. Here, with reference to FIGS. 24A-24C, one example of the score calculation process in step S86 is described below.

Figure 24A:
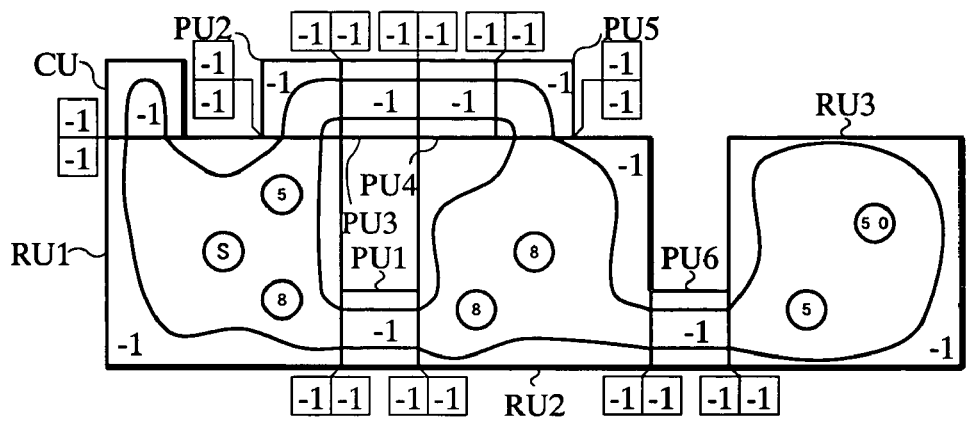
FIG. 24A is an illustration for describing an example of a score calculation process in a first stage in step S86 of FIG. 14.
Figure 24B:
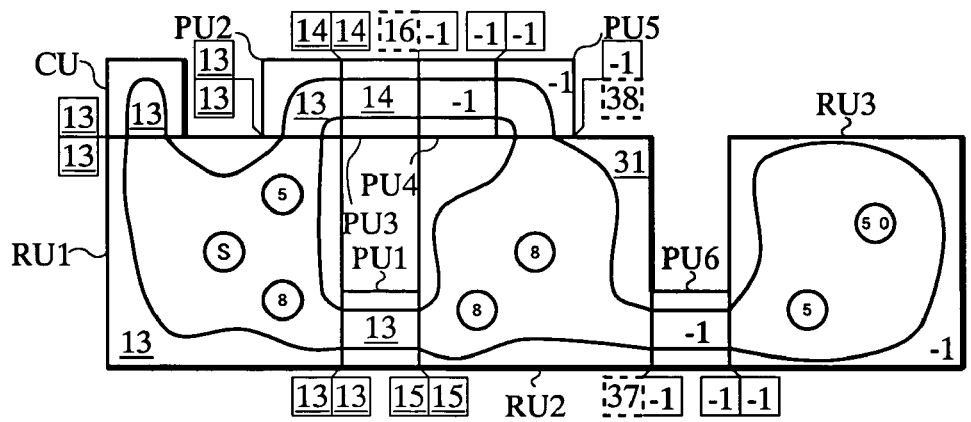
FIG. 24B is an illustration for describing an example of the score calculation process in a second stage in step S86 of FIG. 14.
Figure 24C:
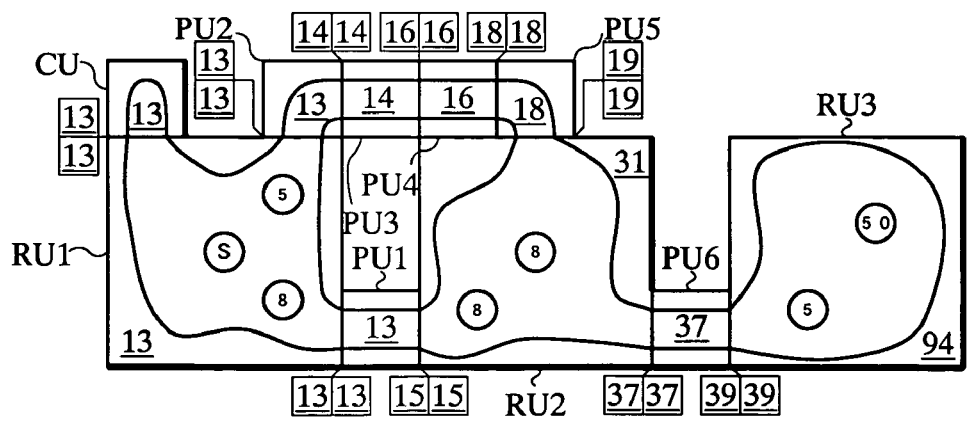
FIG. 24C is an illustration for describing an example of the score calculation process in a third stage in step S86 of FIG. 14.

Maps illustrated in FIGS. 24A-24C have the same unit configuration as that of the maps in FIGS. 22A-22C, 23A, and 23B. The room unit RU1 has disposed thereon two enemy characters having strength of "5" and "8", respectively. The room unit RU2 has disposed thereon two enemy characters each having strength of "8". The room unit RU3 has disposed thereon one enemy character having strength of "5" and one boss enemy character having strength of "50". As described above, the strengths of these enemies are set in advance as attribute values.

FIG. 24A illustrates one example of a map in which unit scores Sc and door scores Scd have been set through the processes in steps S821 and S822. Similarly, in the score calculation process in step S86, all unit scores Sc are set to "−1" and all door scores Scd are set to "−1".

In the process of step S823, the start unit (room unit RU1) has disposed thereon two enemy characters, and the enemy scores of the start unit=5+8=13. Therefore, the unit score Sc of the start unit is determined as "13". Then, in the process of step S824, no gate G is disposed on any door DR of the room unit RU1, and therefore the door scores Scd of the room unit RU1=the unit score Sc=13. Thus, all door scores Scd are temporarily set as "13". Then, in the process of step S826, all door scores Scd of the doors DR of other units connected to the room unit RU1 are also determined as "13". Also, the unit scores Sc of the passage units PU1 and PU2 including these doors DR and the cap unit CU are determined as "13".

FIG. 24B illustrates a state in the course of the process where the unit score Sc of the room unit RU2 has been determined and the door scores Scd of two doors DR included in the room unit RU2 have been temporarily set. At this time, the enemy score of the room unit RU2=8+8=16 is added to the door score Scd between the room unit RU2 and the passage unit PU1=15 to determine the unit score Sc of the room unit RU2=15+16=31. The door score Scd of "the door DR between the room unit RU2 and the passage unit PU6" is temporarily set as "37" by adding the door-to-door distance data "6" from "the door DR between the room unit RU2 and the passage unit PU1" to "the door DR between the room unit RU2 and the passage unit PU6", the enemy score of "16", and the door score Scd of "the door DR between the room unit RU2 and the passage unit PU1" of "15" together. On the other hand, the door score Scd of "the door DR between the room unit RU2 and the passage unit PU5" is temporarily set as "38" by adding the door-to-door distance data "7" from "the door DR between the room unit RU2 and the passage unit PU1" to "the door DR between the room unit RU2 and the passage unit PU5", the enemy score of "16", and the door score Scd of "the door DR between the room unit RU2 and the passage unit PU1" of "15" together. In this state, when the process of step S825 is performed, the door score Scd temporarily set to the passage unit PU3 is determined as "16".

FIG. 24C illustrates the state where all unit scores Sc and the door scores Scd have been determined by repeating the above processes. In FIG. 24C, the unit score Sc of the room unit RU1, which is the start unit, is determined as 13, while the unit score Sc of the room unit RU3 is determined as 94, which is the maximum value. Here, the room unit RU3 is disposed farthest away from the room unit RU1 and, arriving at the room unit RU3 means that the player character have encountered all enemy characters on the map. Also, these enemy characters interfere with the movement of the player character when encountered, making it difficult for the player object to pass through places in the vicinity of their disposition places. Therefore, the unit score Sc is obtained by adding a total of strengths of the enemy characters to be encountered to the distance from the start unit. That is, the unit score Sc is represented as a parameter indicative of the degree of difficulty in arriving at the relevant unit based on the route for the player object to move from the start unit. Also, the door scores Scd are determined in a manner such that the smallest one of the temporarily-set door scores is prioritized. Therefore, the door scores Scd are determined in the order in which the door score Scd of the door DR with a low degree of difficulty for the player object to arrive thereat from the start unit is determined earlier. Therefore, the unit scores Sc of the units are each represented by a parameter indicative of the degree of difficulty for the player object to arrive thereat from the start unit through a simplest movement.

Referring back to FIG. 14, after the score calculation process of step S86, the CPU 31 sets the type and the number of gates to be disposed on the map (step S87), and then goes to the next step. A gate is an obstacle selectively disposed on a door DR to interfere with the player object when passing therethrough while moving on the map. Each gate has set in advance a strength (power required for opening the gate) as an attribute value. Therefore, the gate disposed on the map makes it difficult for the player object pass through the place where the gate is disposed, thereby increasing the degree of difficulty in passing through the place in accordance with the attribute value.

Next, the CPU 31 calculates a transformed unit score T for each unit disposed on the map (step S88), and then goes to the next step. The transformed unit score T has a value obtained by transforming the unit score Sc through a predetermined transformation equation. Specifically, the transformation equation used in step S88 is as follows.

$$Tx = Scmax + Scmin - Sc(Ux)$$

Here, Scmax is a maximum unit score Sc of all unit scores, Scmin is a minimum unit score Sc, and Sc(Ux) is a unit score Sc determined to a unit Ux. For example, in the map illustrated in FIG. 24C, the transformed unit score T of the room unit RU2 is calculated as T=16 by using Scmax=94, Scmin=13, and Sc(Ux)=31.

Next, the CPU 31 calculates a total value Tsum of the transformed unit scores calculated in step S88 (step S89), and then goes to the next step. For example, in the case of the map illustrated in FIG. 24C, the total value Tsum=808.

Figure 25:
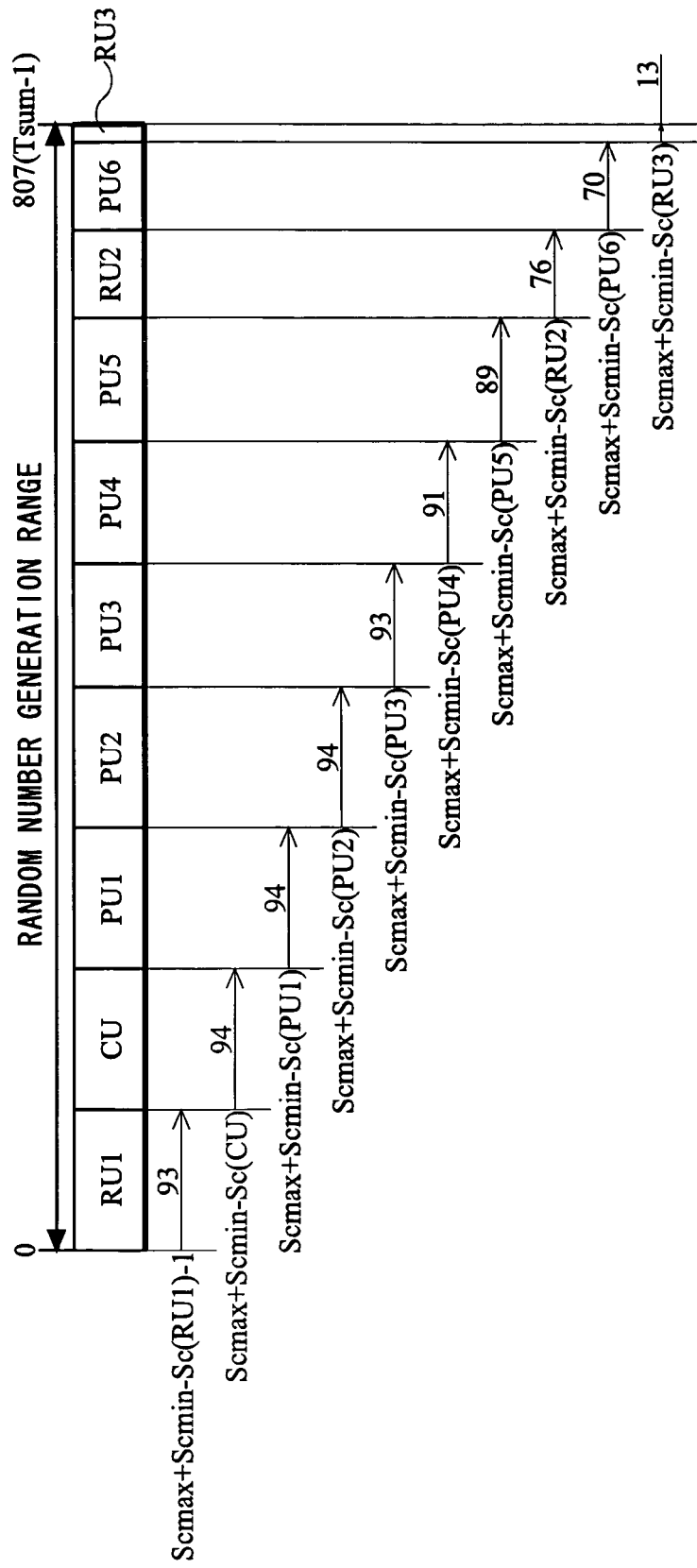
FIG. 25 is an illustration for describing an example of processes in steps S90 and S91 of FIG. 14 performed on a map shown in FIG. 24C.

Next, the CPU 31 executes a random number generation program to generate a random number in a range of 0 to (the total value Tsum−1) (step S90). The CPU 31 then selects a unit based on the generated random number, disposes a gate G on the door DR set in the selected unit (step S91), and then goes to the next step. With reference to FIG. 25, an example of processes in steps S90 and S91 is described below. FIG. 25 is an illustration for describing one example of the processes in steps S90 and S91 performed on the map illustrated in FIG. 24C.

In FIG. 25, the CPU 31 assigns a range of random numbers from 0 to (total value Tsum−1=807) to be generated in step S90 to each unit based on the transformed unit score T calculated in step S88. For example, the transformed unit score T of the room unit RU1 is 94+13−13=94. Therefore, the range of random numbers assigned to the room unit RU1 is set as follows:

0≦(the range assigned to the room unit RU1)≦93.

As for the cap unit CU, the range assigned thereto is as follows so as to be close to the range assigned to the room unit RU1, with its transformed unit score T=94+13−13=94:

93<(the range assigned to the cap unit CU)≦187.

Similarly, a range of random numbers is assigned to each of the other units disposed on the map area. Then, in step S91, if the random number generated in step S90 is within a range of 0 to 93, the room unit RU1 is selected. If the random number is within a range of 94 to 187, the cap unit CU is selected. Then, a gate G is disposed on the door DR set to the selected unit.

As described above, a unit is selected in step S91 based on its random number. As the transformed unit score T is larger, the numerical value range to be assigned to the relevant unit is larger, and therefore the probability of selection of that unit is increased. Since a large transformed unit score T means a small unit score, the gate G has a higher probability of being disposed on a unit having a small unit score. That is, the gate G has a high probability of being disposed on the door DR provided to the unit having a low degree of difficulty for the player object to arrive thereat from the start unit. Note that the unit may have set therein a plurality of doors DR. In this case, the CPU 31 selects a door DR on which the gate G is to be disposed. Also, if the gate G is disposed on all doors DR of the selected unit, the CPU 31 stops a process of disposing a gate G of step S91, and then goes to the next step S92.

Referring back to FIG. 14, the CPU 31 determines whether the number of gates G disposed on the map has reached a predetermined number (step S92). The predetermined number is set to, for example, 50% of the number of gates G to be disposed set in step S87. This predetermined number allows the number of gates G disposed through the above-described selection based on the random number to be adjusted. Note that, when all gates G are disposed based on the above-described selection based on the random number, the predetermined number is set to the number of gates G to be disposed set in step S87. If the number of gates G has not reached the predetermined number, the CPU 31 returns to step S90 for repeating the processes. If the number of gate G has reached the predetermined number, the CPU 31 goes to step S93.

In step S93, the CPU 31 randomly disposes gates G until the number of disposed gates G reaches the number of gates G to be disposed set in step S87. That is, a unit is selected from all units in a simple random manner, and then a gate G is disposed on the selected unit. For example, if "the predetermined number" in step S92 is set to 70% of the number of gates G to be disposed set in step S87, the remaining 30% of gates G are disposed in step S93. The CPU 31 then goes to the next step.

Next, the CPU 31 performs a score calculation process again on each unit on the map with the gates G being disposed in steps S91 and S93 (step S94), and then goes to the next step. The score calculation process in step S94 is similar to the score calculation process of FIG. 16, and therefore is not described in detail herein. Here, with reference to FIGS. 26A-26C, one example of the score calculation process in step S94 is described below.

Figure 26A:
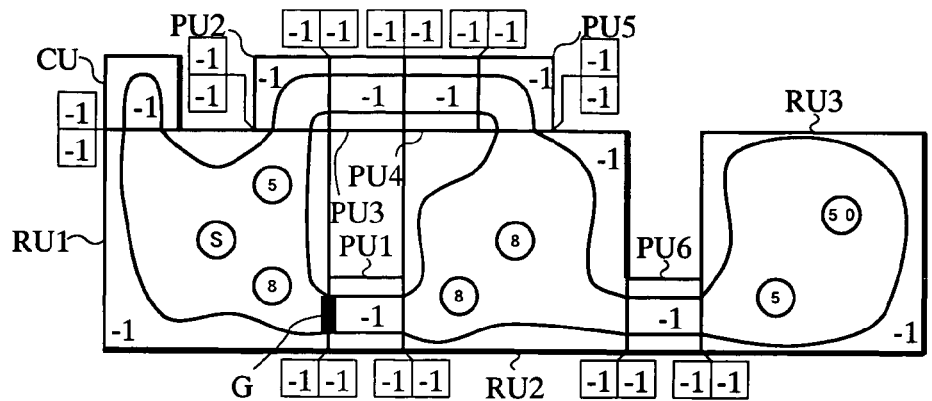
FIG. 26A is an illustration showing an example of a score calculation process in a first stage in step S94 of FIG. 14.
Figure 26B:
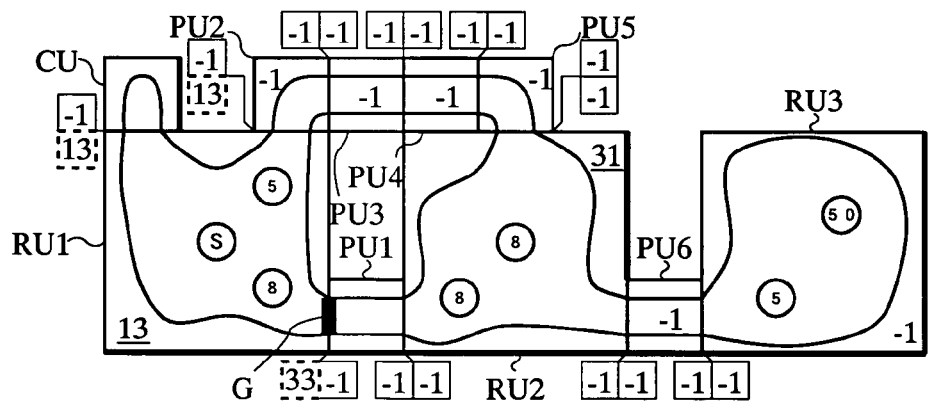
FIG. 26B is an illustration showing an example of the score calculation process in a second stage in step S94 of FIG. 14.
Figure 26C:
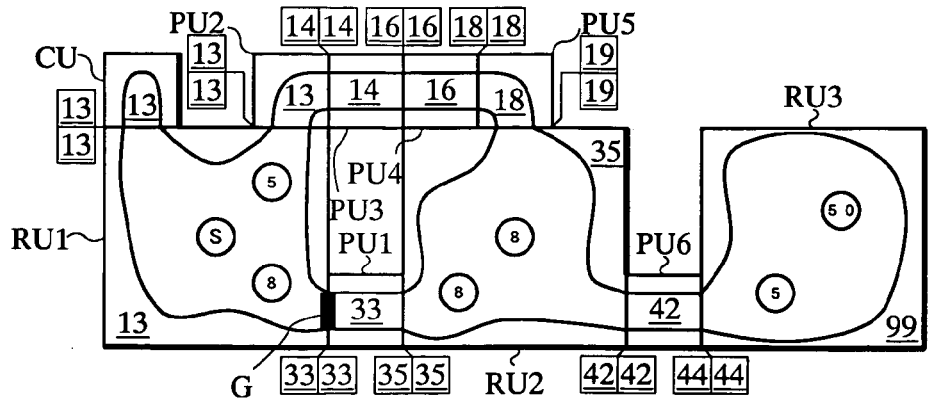
FIG. 26C is an illustration showing an example of the score calculation process in a third stage in step S94 of FIG. 14.

Maps illustrated in FIGS. 26A-26C have the same unit configuration and enemy character disposition as those of the maps illustrated in FIGS. 24A-24C. In addition, a gate G having strength of "20" as an attribute value is disposed on the doors DR between the room unit RU1 and the passage unit PU1. This gate strength is an attribute value set in advance indicative of the degree of interference with passage of the player object moving on the map. Also, the gate G has a gate score having a numerical value equal to this attribute value. In this example, the gate score is set as "20".

FIG. 26A illustrates an example of a map in which unit scores Sc and door scores Scd have been set through the processes of steps S821 and S822. Similarly, in the score calculation process in step S94, all unit scores Sc are set to "−1" and all door scores Scd are set to "−1".

In the process of step S823, the start unit (room unit RU1) has disposed thereon two enemy characters, and the enemy scores of the start unit=5+8=13. Therefore, the unit score Sc of the start unit is determined as "13". Then, in the process of step S824, the door score Scd of each of the doors DR on which no gate G is disposed is equal to the unit score Sc=13. The door score Scd of the door DR on which the gate G is disposed is the unit score Sc+the gate score=13+20=33. Such door scores Scd are temporarily set to the doors DR (refer to the state illustrated in FIG. 26B). Thereafter, the processes of steps S825 through S830 are repeated.

FIG. 26C illustrates the state where all unit scores Sc and door scores Scd have been determined by repeating the above processes. In FIG. 26C, the unit score Sc of the room unit RU1, which is the start unit, is determined as 13, while the unit score Sc of the room unit RU3 is determined as 99, which is the maximum value. Here, the room unit RU3 is disposed farthest away from the room unit RU1 and, arriving at the room unit RU3 means that the player character have encountered all enemy characters on the map. However, compared with the map illustrated in FIG. 24C, the unit score Sc of the room unit RU3 is merely increased by "+5", and does not reflect the increase of the gate score=20. This is because disposition of the gate G causes the degree of difficulty in arriving at the room unit RU3 through the passage unit PU1 to be lower than the degree of difficulty in arriving thereat through the passage units PU2 through PU5. As evident from this, the unit score Sc is represented as a parameter indicative of the degree of difficulty for the player object to arrive at the relevant unit from the start unit through the easiest travel in consideration of the distance from the start unit, the strength of the enemy characters to be encountered, and the degree of difficulty in passing through the gate.

In FIG. 15, after the score calculation process of step S94, the CPU 31 sets the type and the number of items to be disposed on the map (step S95), and then goes to the next step.

Next, the CPU 31 sets a point score T to each of the item slots Si included in the units disposed on the entire map. The point score T is a point set to the item slots Si and the goal slot Sg, and as with the unit score, a parameter indicative of the degree of difficulty in arriving at the item slot Si or the goal slot Sg from the start unit through the easiest travel. Specifically, the point score T is set to a value equal to the unit score of the unit including the relevant item slot Si (step S96), and then goes to the next step.

With reference to FIG. 27, one example of the point score T set to each item slot Si is described below. FIG. 27 is an illustration showing one example of item slots Si1 through Si5 included in the units disposed on the map of FIG. 26C. In FIG. 27, for simplification of the drawing, the door scores Scd and the unit scores of the passage units PU are omitted.

In FIG. 27, the room unit RU1 includes the item slot Si1, the room unit RU2 includes the item slots Si2 and Si3, and the room unit RU3 includes the item slots Si4 and Si5. The unit scores Sc of the room units RU1 through RU3 have been determined as "13", "35", and "99", respectively. For example, the point scores T set to the item slots Si2 and Si3 are both set as the unit score Sc of the room unit RU2, that is, "35". Therefore, the point scores T set to the item slots Si1 through Si5 are set as "13", "35", "35", "99", and "99".

Referring back to FIG. 15, the CPU 31 calculates a total value Tsum of the point scores calculated in step S96 (step S97), and then goes to the next step. For example, in the case of the map illustrated in FIG. 27, the total value Tsum=281.

Figure 28:
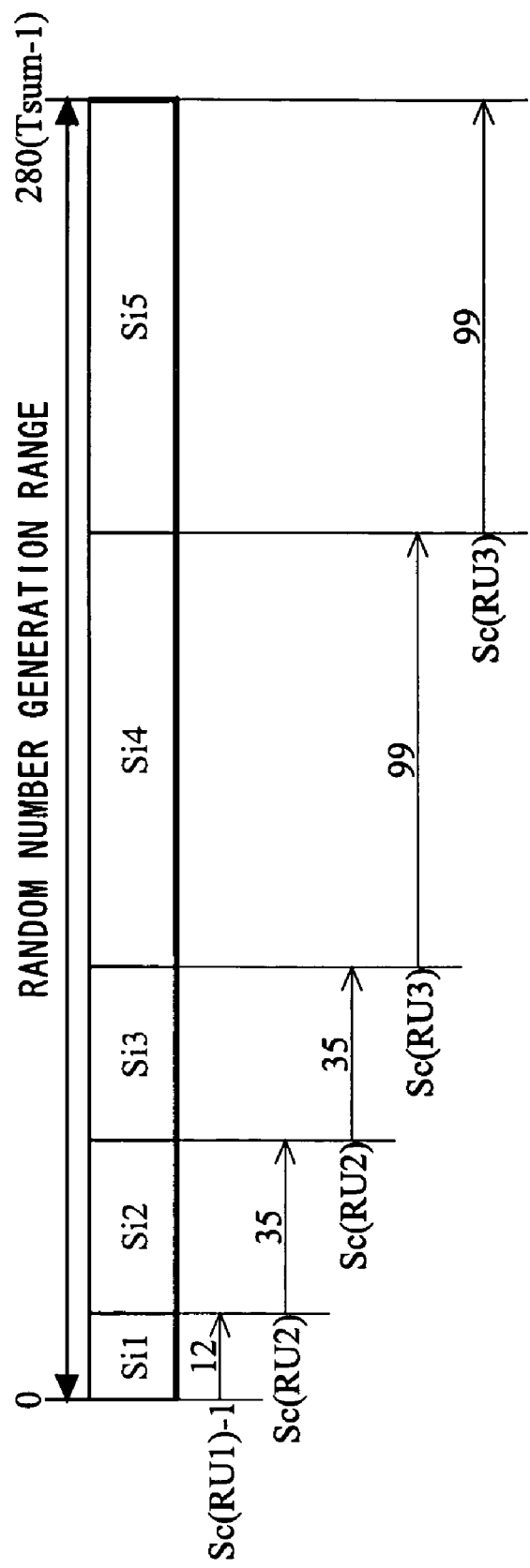
FIG. 28 is an illustration for describing an example of processes in steps S98 and S99 of FIG. 15 performed on map shown in FIG. 27.

Next, the CPU 31 executes a random number program to generate a random number in a range of 0 to (total value Tsum−1) (step S98). With reference to FIG. 28, one example of the processes in steps S98 and S99 is described below. FIG. 28 is an illustration for describing one example of the processes in steps S98 and S99 performed on the map illustrated in FIG. 27.

In FIG. 28, the CPU 31 assigns a range of random numbers from 0 to (total value Tsum−1) to be generated in step S98 to each item slot Si based on the point score T. For example, the point score T of the item slot Si1 is 13. Therefore, the range of random numbers assigned to the item slot Si1 is set as follows:

0≦(the range of random numbers assigned to the item slot Si1)≦12.

As for the item slot Si2, the range of random numbers assigned thereto is 12<(the range assigned to the cap unit CU)≦47 so as to be close to the range of random numbers assigned to the item slot Si1, with the point score T of the item slot Si2 is 35. Similarly, a range of random number is assigned to each of the other slots included in the units disposed on the map area. Then, in step S99, if the random number generated in step S98 is within a range of 0 to 12, the item slot Si1 is selected. If the random number is within a range of 13 to 47, the item slot Si2 is selected. An item is disposed on the selected item slot Si.

As described above, an item slot Si is selected in step S99 based on its random number. As the unit score Sc of the unit including the item slot Si is larger, the probability of selection of that item slot is increased. That is, there is a high probability of disposing an item on the item slot Si included in the unit having a high degree of difficulty for the player object to arrive thereat from the start unit. That is, the probability of disposing an item in the vicinity of the start point is low. If the selected item slot Si already has an item disposed thereon, the CPU 31 stops an item disposing process of step S99, and then goes to the next step S100.

Referring back to FIG. 15, the CPU 31 determines whether the number of items disposed on the map has reached a predetermined number (step S100). If the number of items has not yet reached the predetermined number, the CPU 31 returns to step S98 for repeating the process. If the number of items has reached the predetermined number, the CPU 31 goes to the next step S101.

In step S101, the CPU calculates a point score for a goal slot Sg included in the units disposed on the map, calculates a transformed point score T obtained through conversion of the point score, and then goes to the next step. In this step S101, the unit score Sc of the unit including the goal slot Sg is taken as the point score, and the positive square root of the point score is taken as the transformed point score T for the goal slot Sg. That is, the transformed point score T for the goal slot Sgx included in the unit Ux is calculated as follows:

$$Tx = \sqrt{Sc(Ux)}$$

Here, Sc(Ux) is a unit score determined for a unit Ux.

Next, the CPU 31 calculates a total value Tsum of the transformed point scores T calculated in step S101 (step S102), and then goes to the next step.

Next, the CPU 31 executes a random number generation program to generate a random number in a range of 0 to (total value Tsum−1) (step S103). The CPU 31 selects a goal slot Sg based on the generated random number, sets the selected goal slot Sg as the goal point of the map (step S104), and then ends the subroutine of the game element disposition process and also the map generation process shown in FIG. 11. The processes in steps S103 and S104 are similar to those in steps S98 and S99, and therefore are not described in detail herein.

Here, in step S104, a goal slot Sg is selected based on the random number. As the unit score Sc of the unit including the goal slot Sg is larger, the probability of selection of that unit is larger. That is, there is a high probability of setting a goal point at the goal slot Sg included in the unit having a high degree of difficulty for the player object to arrive thereat from the start unit. That is, the probability of setting a goal point in the vicinity of the start point is low. However, the positive square of the unit score Sc is taken as the transformed point score T and a range of numerical values is assigned to each goal slot Sg based on the transformed point score T. Therefore, compared with the case where a range of numerical values is assigned based on the point score T (=unit score Sc) as in the above-described item disposition process (S95 through S100), the degree of influence of the unit score Sc is lower. That is, the degree of influence of the unit score Sc on the element selected based on the random number can be adjusted depending on the scheme of calculating the transformed point score T. For example, if the cube root of the unit score Sc is taken as the transformed point score T, the degree of influence of the unit score Sc can be further reduced. Conversely, if the square or cube of the unit score Sc is taken as the point score T, the degree of influence of the unit score Sc can be increased.

When the above enemy characters and the items are disposed on the map, the number of enemy slots Se and the number of item slots Si may become insufficient with respect to the number of enemy characters set in step S83 and the number of items set in step S95. In this case, the passage unit PU or the cap unit CU originally not including an enemy slot Se or an item slot Si may be randomly selected, and an enemy character or an item may be disposed on a passage zone PZ included in the selected unit. For example, if the number of enemy slots Se is insufficient with respect to the number of enemy characters to be disposed, the CPU 31 randomly selects passage units PU, and then disposes enemy characters on the passage zones PZ included in the selected units. Also, if the number of item slots Si is insufficient with respect to the number of items to be disposed, the CPU 31 selects the cap unit CU with priority, and then disposes an item on its passage zone PZ. Furthermore, if the number of item slots Si is still insufficient with respect to the number of items to be disposed even with the cap unit CU, the CPU 31 randomly selects passage units PU, and then disposes an item on the passage zones PZ included in the selected units.

As described above, in the game machine according to one exemplary illustrative non-limiting implementation, a unit score is calculated for each route by evaluating a distance starting from the start point to each unit on the map, the strength of an enemy character to be encountered, the degree of difficulty for the player object to pass through a gate, etc. This unit score can be taken as an index of the degree of difficulty for the player object to arrive at each unit from the start point. By using this unit score, the game elements can be appropriately disposed on the map in accordance with the degree of difficulty. Furthermore, the game elements are disposed on places on the map in a random manner. Therefore, a map full of diversity can be automatically generated.

Also, in the above-described flowcharts, game elements are disposed on the generated map in the order of an enemy character, an item, and then a goal point. This is not meant to be restrictive. Alternatively, for example, if a goal point is desired to be set on the unit farthest away from the start point, the goal point may be first set. By performing a game element disposition process in an appropriate disposition order depending on the type of the game element to be disposed or the unit, a desired game element disposition can be achieved.

Also, the unit score for each of the units other than the start unit is calculated by adding the enemy score disposed on the relevant unit to the door score determined for the door included in the relevant unit (refer to step S828). The unit score eventually has a value obtained by adding the enemy score to a minimum value of the door scores determined for the door included in the relevant unit. However, the door score is not restricted to the minimum door score. Alternatively, for example, the unit score may be calculated by adding the enemy score of the relevant unit to a maximum value of the door scores determined for the door included in the relevant unit. Still alternatively, the unit score may be calculated by adding the enemy score of the relevant unit to an average value of the door scores determined for the door included in the relevant unit.

Furthermore, in the score calculation process according to the above description, the door score of the start unit is temporarily set (step S824 of FIG. 16). Alternatively, the door score of the start unit may not be temporarily set but may be originally determined, and only the door scores of the units other than the start units may be temporarily set and then a minimum value of the door scores may be later determined as the door score.

Still further, in the above description, the room units, the passage units, and the cap unit, which are unit images forming a map, each have a rectangular shape. The shapes of these units are not restricted to rectangular shapes. For example, the units may have a regular hexagonal shape or a polygon shape.

While the invention has been described in detail, the foregoing description is in all aspects illustrative and not restrictive. It is understood that numerous other modifications and variations can be devised without departing from the scope of the invention.

What is claimed is:

1. A game machine for disposing at least one additional game element on a game map formed by a plurality of units, said game machine comprising:

a unit score calculator which calculates a unit score for each of the units, the unit score being determined based on route information regarding a route starting from a start unit serving as a start point on the game map to each unit;

a disposition unit selector which selects a unit on which the game element is disposed, based on the unit score calculated by the unit score calculator;

a game element disposer which disposes the game element on the unit selected by the disposition unit selector, thereby dynamically creating a game map that provides a desired degree of difficulty by adjusting the complexity of the game map through selective addition of obstacles; and a display interface that generates a display of at least a portion of said game map, wherein the unit score calculator calculates a distance parameter for each of the units as the unit score, the distance parameter being indicative of a distance of the route starting from the start unit to each unit, and wherein each of the units includes at least one connecting portion for connection to another unit, and with the connecting portion being connected to another connecting portion of another unit, the units are combined to form the game map, the game machine further comprises connecting portion distance data defining means which defines connecting portion distance data indicative of a distance between connecting portions in a unit having a plurality of the connecting portions, and the unit score calculator calculates the distance parameter by totaling the connecting portion distance data for connecting portions to be passed through on the route starting from the start unit to each unit.

2. The game machine according to claim 1, wherein the unit score calculator calculates the unit score based on game elements located in a unit to be passed through on the route starting from the start unit to each unit.

3. The game machine according to claim 2, further comprising
attribute value setting means which sets a unique attribute value based on a type of each of the game elements, wherein
the unit score calculator calculates the unit score based on the attribute value set to each of the game elements located in the unit to be passed through.

4. The game machine according to claim 1, wherein each of the units includes at least one connecting portion for connection to another unit, and with the connecting portion being connected to another connecting portion of another unit, the units are combined to form the game map, the game machine further includes connecting portion score calculating means which calculates, for each connecting portion, a connecting portion score determined based on route information regarding a route from the start unit to each connecting unit, and the unit score calculator calculates the unit score for each of the units based on the connecting portion score calculated for the connecting portion included in a relevant unit.

5. The game machine according to claim 4, wherein the unit score calculator calculates the unit score for a unit which includes a plurality of the connecting portions based on a minimum value of the connecting unit scores calculated for the connecting portions.

6. The game machine according to claim 5, further comprising
start unit connecting portion score temporarily-setting means which calculates the connecting portion score for each of the connecting portions included in the start unit through a predetermined calculation scheme and temporarily sets the calculated connecting portion score, wherein
the unit score calculator includes:
minimum connecting portion score determining means which determines a minimum value of the connecting portion scores temporarily set to the connecting portions as the connecting portion score of a connecting portion having the minimum value;
the coupled connecting portion score determining means which determines the minimum value as the connecting portion score of a connecting portion coupled to the connecting portion whose connecting portion score has been determined by the minimum connecting portion score determining means; and
connecting portion score temporarily-setting means which calculates a connecting portion score for a first connecting portion whose connecting portion score has not yet been determined and temporarily sets the calculated connecting portion score, the first connecting portion being included in a unit which also includes a second connecting portion whose connecting portion score has been determined by the minimum connecting portion score determining section or the coupled connecting portion score determining section, and the connecting portion score for the first connecting portion being calculated based on route information regarding a route from the second connecting portion to the first connecting portion included in the unit, and
with a repeat of processes performed by the minimum score determining means, the coupled connecting portion score determining means, and the connecting portion score temporarily-setting means, the unit score calculator sequentially determines connecting portion scores of the connecting portions on the game map, and calculates the unit score based on the determined connecting portion scores.

7. The game machine according to claim 1, wherein the disposition unit selector selects the unit on which the game element is disposed so that a ratio of a unit score of one unit with respect to a total of the unit scores is equal to a probability of selecting the one unit.

8. The game machine according to claim 1, wherein the disposition unit selector includes transformed unit score calculating means which calculates a transformed unit score by transforming the unit score calculated by the unit score calculating means through a predetermined function, and
the disposition unit selector selects the unit on which the game element is disposed so that a ratio of a unit score of one unit with respect to a total of the unit scores is equal to a probability of selecting the one unit.

9. The game machine according to claim 8, wherein the function used by the transformed unit score calculating means is varied depending on a type of the game element to be disposed by the game element disposer.

10. The game machine according to claim 7, wherein the disposition unit selector includes:
random number generating means which generates a random number in a predetermined range; and
range assigning means which assigns a part of the predetermined range to each of the units based on a ratio of each unit score with respect to the total of the unit scores or a ratio of each unit score with respect to a total of the transformed unit scores, and the disposition unit selector selects the unit on which the game element is disposed depending on whether the random number generated by the random number generating means is within the part of the range assigned to the unit by the range assigning means.

11. The game machine according to claim 7, wherein the game map includes at least a unit including a point at which the game element can be disposed, the disposition unit selector includes:

random number generating means which generates a random number within a predetermined range; and range assigning means which sets the unit score of the unit including the point as a point score of the point, and assigns a part of the predetermined range to each of a plurality of the points based on a ratio of each point score with respect to a total of point scores or a ratio of each point score transformed through a predetermined function with respect to a total of the transformed point scores, and the disposition unit selector selects a point where the game element is disposed depending on whether the random number generated by the random number generating means is within the part of the range assigned to the point by the range assigning means.

12. The game machine according to claim 1, further comprising:

unit storage means which store in advance the plurality of units; and game map generating means which generates the game map by randomly combining the units stored in the unit storage means.

13. A game machine for disposing an additional game element on a game map which is formed by a plurality of units and defines an area in which an object can move in the course of a game, comprising:

unit score calculating means which calculates a unit score for each of the units, the unit score being a parameter indicative of a degree of difficulty for the object to move from a start unit serving as a start point on the game map to each unit;

disposition unit selecting means which selects, based on the unit score calculated by the unit score calculating means, a unit on which the game element is disposed;

game element disposing means which disposes the game element on the unit selected by the disposition unit selecting means, thereby dynamically creating a game map that provides a desired degree of difficulty by adjusting the complexity of the game map through selective addition of obstacles; and a display interface that generates a display of at least a portion of said game map, wherein the unit score calculating means calculates a distance parameter for each of the units as the unit score, the distance parameter being indicative of a distance of the route starting from the start unit to each unit, and wherein each of the units includes at least one connecting portion for connection to another unit, and with the connecting portion being connected to another connecting portion of another unit, the units are combined to form the game map, the game machine further comprises connecting portion distance data defining means which defines connecting portion distance data indicative of a distance between connecting portions in a unit having a plurality of the connecting portions, and the unit score calculator calculates the distance parameter by totaling the connecting portion distance data for connecting portions to be passed through on the route starting from the start unit to each unit.

14. A data storage medium having stored therein a game program causing a computer to execute a process of disposing an additional game element on a game map formed by a plurality of units, the stored game program comprising:

instructions for calculating a unit score for each of the units, the unit score being determined based on route information regarding a route starting from a start unit serving as a start point on the game map to each unit;

instructions for selecting, based on the unit score calculated in the unit score calculating step, a unit on which the game element is disposed;

instructions for disposing the game element on the unit selected by the disposition unit selecting instructions, thereby dynamically creating a game map that provides a desired degree of difficulty by adjusting the complexity of the game map through selective addition of obstacles; and instructions that generate a display of at least a portion of said game map, wherein the unit score calculating instructions include instructions for calculating a distance parameter for each of the units as the unit score, the distance parameter being indicative of a distance of the route starting from the start unit to each unit, and wherein each of the units includes at least one connecting portion for connection to another unit, and with the connecting portion being connected to another connecting portion of another unit, the units are combined to form the game map, the game machine further comprises connecting portion distance data defining means which defines connecting portion distance data indicative of a distance between connecting portions in a unit having a plurality of the connecting portions, and the unit score calculator calculates the distance parameter by totaling the connecting portion distance data for connecting portions to be passed through on the route starting from the start unit to each unit.

15. The data storage medium having stored therein the game program according to claim 14, wherein unit score calculating instructions further include instructions for calculating a unit score based on game elements located in a unit to be passed through on the route starting from the start unit to each unit.

16. The data storage medium having stored therein the game program according to claim 14, wherein each of the units includes at least one connecting portion for connection to another unit, and with the connecting portion being connected to another connecting portion of another unit, the units are combined to form the game map, the stored game program further includes instructions for calculating a connecting portion score for each of connecting portions included in the start unit through a predetermined calculation scheme, and temporarily setting the calculated connecting portion score, wherein the unit score calculating instructions further include instructions for:

determining a minimum value of the connecting portion scores temporarily set to the connecting portions as the connecting portion score of a connecting portion having the minimum value;

determining the minimum value as the connecting portion score of a connecting portion coupled to the connecting portion whose connecting portion score has been determined by the minimum connecting portion score determining instructions and calculating a connecting portion score for a first connecting portion whose connecting portion score has not yet been determined and temporarily setting the calculated connecting portion score, the first connecting portion being included in a unit which also includes a second connecting portion whose connecting portion score has been determined by the minimum connecting portion score determining instructions or by the coupled connecting portion score determining instructions, and the connecting portion score for the first connecting portion being calculated based on route information regarding a route from the second connecting portion to the first connecting portion included in the unit, and the unit score calculating instructions include instructions that repeat minimum score determination, the coupled connecting portion score determination, and the connecting portion score temporarily-setting so that, connecting portion scores of the connecting portions on the game map are sequentially determined, and the unit score is calculated based on the determined connecting portion score.

17. The data storage medium having stored therein the game program according to claim 14, wherein the disposition unit selecting instructions include instructions that select the unit on which the game element is disposed is selected so that a ratio of a unit score of one unit with respect to a total of the unit scores is equal to a probability of selecting the one unit.

18. The data storage medium having stored therein the game program according to claim 14, wherein the disposition unit selecting instruction includes:

instructions that generate a random number in a predetermined range; and instructions that assign a part of the predetermined range to each of the units based on a ratio of each unit score with respect to a total of the unit scores or a ratio of each unit score calculated in the unit score calculating step and then transformed through a predetermined function with respect to a total of the transformed unit scores, and wherein the disposition unit selecting instructions select the unit on which the game element is disposed depending on whether the random number generated by the random number generating instructions is within the part of the range assigned to the unit in the range assigning.

19. In a gaming system, a method of disposing an additional game element onto a game map defined at least in part by units, said method comprising the following steps performed by the central processing unit of the gaming system in communication with a graphics processor:

calculating a unit score for each of the units, the unit score being determined based on route information regarding a route starting from a start unit serving as a start point on the game map to each unit, including calculating a distance parameter for each of the units as the unit score, the distance parameter being indicative of a distance of the route starting from the start unit to each unit;

selecting, based on the unit score calculated in the unit score calculating step, a unit on which the game element is disposed; and disposing the game element on the unit selected in the disposition unit selecting step, thereby dynamically creating a game map that provides a desired degree of difficulty by adjusting the complexity of the game map through selective addition of obstacles;

wherein a display device coupled to the gaming system displays at least a portion of said game map, and wherein each of the units includes at least one connecting portion for connection to another unit, and with the connecting portion being connected to another connecting portion of another unit, the units are combined to form the game map, the method performed by the central processing unit further comprises defining connecting portion distance data indicative of a distance between connecting portions in a unit having a plurality of the connecting portions, and calculating the distance parameter by totaling the connecting portion distance data for connecting portions to be passed through on the route starting from the start unit to each unit.

20. A game playing method comprising the following steps performed by a central processing unit in communication with a graphics processor:

defining a variable virtual vertical gaming environment for a player character to move within, said gaming environment including at least one destination for the player character to visit;

determining degree of difficulty of said player character visiting said destination;

placing at least one object within said virtual gaming environment at a position determined at least in part by said determined degree of difficulty, thereby dynamically creating a game map that provides a desired degree of difficulty by adjusting the complexity of the game map through selective addition of obstacles, including calculating a distance parameter for each of the obstacles as the obstacle score, the distance parameter being indicative of a distance of the route starting from a start obstacle to each obstacle;

receiving user inputs; and controlling interactively display on a display device of at least a portion of the game map at least in part in response to said user inputs, wherein each of the units includes at least one connecting portion for connection to another unit, and with the connecting portion being connected to another connecting portion of another unit, the units are combined to form the game map, the method performed by the central processing unit further comprises defining connecting portion distance data indicative of a distance between connecting portions in a unit having a plurality of the connecting portions, and calculating the distance parameter by totaling the connecting portion distance data for connecting portions to be passed through on the route starting from the start unit to each unit.

21. The method of claim 20 wherein said placed object comprises a treasure.

22. The method of claim 20 wherein said placed object comprises an enemy character.

* * * * *